United States Patent
Hadaschik et al.

(10) Patent No.: US 11,206,168 B2
(45) Date of Patent: Dec. 21, 2021

(54) RECEIVER AND METHOD FOR PROVIDING A PHASE COHERENCY FOR FREQUENCY HOPPING MULTITONE SIGNALS

(71) Applicants: FRAUNHOFER-GESELLSCHAFT ZUR FOERDERUNG DER ANGEWANDTEN FORSCHUNG E.V., Munich (DE); FRIEDRICH-ALEXANDER-UNIVERSITAET ERLANGEN-NUERNBERG, Erlangen (DE)

(72) Inventors: Niels Hadaschik, Erlangen (DE); Marc Fassbinder, Erlangen (DE); Jörn Thielecke, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/395,185

(22) Filed: Apr. 25, 2019

(65) Prior Publication Data

US 2019/0253301 A1 Aug. 15, 2019

Related U.S. Application Data

(63) Continuation of application No. PCT/EP2017/077652, filed on Oct. 27, 2017.

(30) Foreign Application Priority Data

Oct. 27, 2016 (EP) .................................... 16195991

(51) Int. Cl.
*H04L 27/26* (2006.01)
*G01S 13/38* (2006.01)
(Continued)

(52) U.S. Cl.
CPC ............ *H04L 27/2666* (2013.01); *G01S 5/14* (2013.01); *G01S 13/38* (2013.01); *H04L 5/0007* (2013.01);
(Continued)

(58) Field of Classification Search
CPC ......... G01S 5/14; G01S 13/38; H04L 5/0007; H04L 5/0098; H04L 5/023;
(Continued)

(56) References Cited

U.S. PATENT DOCUMENTS

| 5,410,538 A | 4/1995 | Roche et al. |
| 5,583,517 A | 12/1996 | Yokev et al. |

(Continued)

FOREIGN PATENT DOCUMENTS

| CN | 1956058 A | 5/2007 |
| CN | 102664859 A | 9/2012 |

(Continued)

OTHER PUBLICATIONS

Timor, Uzi, "Multitone Frequency-Hopped MFSK System for Mobile Radio." Bell System Technical Journal 61.10 (1982): 3007-3017.
(Continued)

*Primary Examiner* — Thomas R Cairns
(74) *Attorney, Agent, or Firm* — Perry + Currier Inc.

(57) ABSTRACT

The invention concerns a method and a receiver configured to receive a radio signal carrying information, the radio signal including an overall frequency band having at least three different sub carriers. The receiver is further configured to receive, during a first time period, a first multitone signal carrying a first portion of the radio signal, the first multitone signal including a first and a second sub carrier which are received simultaneously, and to determine a first phase difference between the first and the second sub carrier. The receiver is further configured to receive, during a second time period, a second multitone signal carrying a second portion of the radio signal, the second multitone signal including the second and a third sub carrier which are received simultaneously, and to determine a second phase difference between the second and the third sub carrier.

(Continued)

According to the invention, the receiver is configured to determine a phase difference between the first and the third sub carrier using the first phase difference and the second phase difference.

31 Claims, 15 Drawing Sheets

(51) Int. Cl.
    *G01S 5/14*     (2006.01)
    *H04L 5/00*     (2006.01)
    *H04L 5/02*     (2006.01)
    *H04W 72/04*     (2009.01)

(52) U.S. Cl.
    CPC ............ *H04L 5/0098* (2013.01); *H04L 5/023* (2013.01); *H04W 72/0453* (2013.01)

(58) Field of Classification Search
    CPC ............... H04L 27/2666; H04L 5/0005; H04L 5/0008–0012; H04L 5/003; H04L 5/026; H04L 27/2601; H04W 72/0453; H04W 72/04; G02S 5/14; G02S 5/145; G02S 5/13–38; H04B 1/713
    See application file for complete search history.

(56) References Cited

U.S. PATENT DOCUMENTS

| | | | |
|---|---|---|---|
| 5,596,330 | A | 1/1997 | Yokev et al. |
| 6,731,908 | B2 | 5/2004 | Berliner et al. |
| 6,963,599 | B1 | 11/2005 | Dunn |
| 7,405,696 | B2 | 7/2008 | Kennedy, Jr. et al. |
| 8,116,817 | B2 | 2/2012 | Noll et al. |
| 8,125,388 | B2 | 2/2012 | Kennedy, Jr. et al. |
| 8,483,301 | B2 * | 7/2013 | Ray .................. H04W 56/0065 375/260 |
| 8,712,475 | B2 | 4/2014 | Noll et al. |
| 2010/0009644 | A1 | 1/2010 | Izumi et al. |
| 2012/0256726 | A1 * | 10/2012 | Honkanen ........... H04W 64/006 340/10.1 |
| 2015/0006073 | A1 | 1/2015 | Moshfeghi |

FOREIGN PATENT DOCUMENTS

| | | |
|---|---|---|
| CN | 102957451 A | 3/2013 |
| WO | WO-2014093400 A1 | 6/2014 |

OTHER PUBLICATIONS

Glisic, Savo, et al. "Advanced frequency hopping modulation for spread spectrum WLAN." IEEE Journal on Selected Areas in Communications 18.1 (2000): 16-29.
Stadius, Karl, et al. "Multitone fast frequency-hopping synthesizer for UWB radio." IEEE transactions on microwave theory and techniques 55.8 (2007): 1633-1641.
Krim, Hamid, and Mats Viberg, "Two Decades of Array Signal Processing Research." IEEE signal processing magazine (1995).
Capon, Jack, "High-resolution frequency-wavenumber spectrum analysis." Proceedings of the IEEE 57.8 (1969): 1408-1418.
Schmidt, Ralph, "Multiple emitter location and signal parameter estimation." IEEE transactions on antennas and propagation 34.3 (1986): 276-280.
Schmidt, R., and R. Franks, "Multiple source DF signal processing: An experimental system." IEEE Transactions on antennas and propagation 34.3 (1986): 281-290.
Roy, Richard, and Thomas Kaitath, "ESPRIT-estimation of signal parameters via rotational invariace techniques." IEEE Transactions on acoustics, speech, and signal processing 37.7 (1989): 984-995.
Yilmazer, Nuri, Tapan K. Sarkar, and Magdalena Salazar-Palma, "DOA Estimation using Matrix Pencil and ESPRIT methods using single and multiple snapshots." 2010 URSI International Symposium on Electromagnetic Theory, IEEE, 2010, pp. 215-218.
Vanderveen, Michaela C., Constantinos B. Papadias, and Arogyaswami Paulraj, "Joint angle and delay estimation (JADE) for multipath signals arriving at an antenna array." IEEE Communications letters 1.1 (1997): 12-14.
Van Der Veen, A-J., Michaela C. Vanderveen, and A. Paulraj, "SI-JADE: an algorithm for joint angle and delay estimation using shift-invariance properties." First IEEE Signal Processing Workshop on Signal Processing Advances in Wireless Communications, IEEE, 1997.
Weiss, Anthony J., and Alon Amar, "Direct position determination of multiple radio signals." EURASIP Journal on Applied Signal Processing 2005 (2005): 37-49.
Hadaschik, Niels, et al. "Direct positioning with multiple antenna arrays." 2015 International Conference on Indoor Positioning and Indoor Navigation (IPIN), IEEE, 2015.
Blewitt, Geoffrey, "Carrier phase ambiguity resolution for the Global Positioning System applied to geodetic baselines up to 2000 km." Journal of Geophysical Research: Solid Earth 94.66 (1989): 10187-10203.
Teunissen, P. J. G., P. J. De Jonge, and C. C. J. M. Tiberius, "The LAMBDA method for fast GPS surveying," International Symposium "GPS Technology Applications" Bucharest, Romania, 1995.
Sackenreuter, Benjamin, et al. "Low-complexity PDcA-based iocalization." 2016 international conference on indoor positioning and indoor navigation (IPIN). IEEE, 2016. URL: https://ieeexplore.ieee.org/stamp/stamp.jsp?tp=arnumber=7743692.
Neokosmidis, Ioannis, et al. "Impact of nonlinear LED transfer function on discrete multitone modulation: Analytical approach." Journal of Lightwave technology 27.22 (2009): 4970-4978.
Xingbo, Hu, "Algorithms and VLSI Architectures for an OFMD-based Broadband Wireless Baseband Receiver" with English translation of abstract, Graduate School of the Fudan University, Shanghai, Oct. 2007.

\* cited by examiner

RECEIVER AND METHOD FOR PROVIDING A PHASE COHERENCY FOR FREQUENCY HOPPING MULTITONE SIGNALS

CROSS-REFERENCE TO RELATED APPLICATION

This application claims priority from European Patent Application No. EP 16195991.1, which was filed on Oct. 27, 2016, and is incorporated herein in its entirety by reference.

BACKGROUND OF THE INVENTION

The present invention concerns the field of wireless communication networks or systems, in particular a method for obtaining a reconstructed phase coherency of a multitone signal being transmitted in one or more frequency hopping channels, which may be used, for example, for a localization of user equipment, like mobile terminals, in such a wireless communication network.

Therefore, embodiments of the present invention relate to a receiver for receiving a radio signal according to claim 1, a receiver for receiving a radio signal according to claim 13, a method for receiving a radio signal according to claim 21, a method for receiving a radio signal according to claim 22, a computer program according to claim 24 for performing said methods, and a wireless communication network according to claim 25.

FIG. 15 is a schematic representation of an example of a network infrastructure, such as a wireless communication network or wireless communication system, including a plurality of base stations $eNB_1$ to $eNB_5$, each serving a specific area surrounding the base station schematically represented by the respective cells $1500_1$ to $1500_5$.

The base stations are provided to serve users within a cell. A user may be a stationary device or a mobile device. Further, the wireless communication system may be accessed by IoT devices which connect to a base station or to a user. IoT devices may include physical devices, vehicles, buildings and other items having embedded therein electronics, software, sensors, actuators, or the like as well as network connectivity that enable these devices to collect and exchange data across an existing network infrastructure.

FIG. 15 shows an exemplary view of only five cells, however, the wireless communication system may include more such cells.

FIG. 15 shows two users UE1 and UE2, also referred to as user equipment (UE), that are in cell $1500_2$ and that are served by base station $eNB_2$. Another user $UE_3$ is shown in cell $1500_4$ which is served by base station $eNB_4$. The arrows $1502_1$, $1502_2$ and $1502_3$ schematically represent uplink/downlink connections for transmitting data from a user $UE_1$, $UE_2$ and $UE_3$ to the base stations $eNB_2$, $eNB_4$ or for transmitting data from the base stations $eNB_2$, $eNB_4$ to the users $UE_1$, $UE_2$, $UE_3$.

Further, FIG. 15 shows two IoT devices $1504_1$ and $1504_2$ in cell $1500_4$, which may be stationary or mobile devices. The IoT device $1504_1$ accesses the wireless communication system via the base station $eNB_4$ to receive and transmit data as schematically represented by arrow $1506_1$. The IoT device $1504_2$ accesses the wireless communication system via the user $UE_3$ as is schematically represented by arrow $1506_2$.

The wireless communication system may be, for instance, any multitone system. In particular narrowband modulations with small total bandwidth (e.g. typically <5 MHz) but distinctly separated spectral peaks within this bandwidth may be used. Example implementations may be strongly coupled analog multicarrier, binary offset carrier (BOC), alternative binary offset carrier (AltBOC) or multiplexed binary offset carrier (MBOC).

In a wireless communication network, like the one depicted in FIG. 15, it may be desired to locate a UE with a certain accuracy in a cell. One approach to locate a UE within a cell is based on an observed time difference of arrival (OTDoA) estimation that may be used in cellular communication networks, such as NB-IOT, and which is a downlink positioning method that relies on the calculation of time of arrival (ToA) estimates e.g. using dedicated position reference signals (PRS) received at the user equipment UE from one or more surrounding base stations (eNB).

PRS sequences are downlink signals that are designed for positioning purposes and that are broadcast to all radio terminals within a cell. The PRS sequences are radiated with the same transmit power from the antenna of the base station or the remote radio head (RRH) in all directions to cover all users at any location of the cell, i.e., to provide a cell-wide coverage.

To distinguish the PRS sequences from different cells, each PRS sequence has associated therewith a cell-specific identifier also referred to as a physical cell identifier (PCI). The PCI is unique in a specific area and is used to identify the cell and thus the PRS sequence.

At least three timing measurements from geometrically dispersed base stations are needed, relative to the UE's internal time base, in order to obtain a unique position in a plane. Four base stations are needed to obtain a unique position in a three-dimensional space.

As is shown in FIG. 15, the base stations of the wireless communication network include a plurality of antennas ANT, for example formed by an antenna array including a plurality of antenna elements, and the UE may also include more than one antenna. In scenarios in which both the UE and the base station are equipped with a plurality of antennas, location-independent parameters may be exploited in addition to the OTDoA measurements of the LoS (Line of Sight) or NLoS (Non Line of Sight) path components, for example an angle of arrival (AoA) at the UE and an angle of departure (AoD) at the base station may be used.

Instead of detecting only NLoS errors and removing the influence of these errors, examples of localization techniques may benefit from the NLoS channel propagation by exploiting the geometrical relationship of possible UE locations implied by the NLoS path components.

The wireless communication networks may use frequency hopping transmission methods. In the present invention, BOC, AltBOC, MBOC or sparse OFDM (Orthogonal Frequency Division Multiplex) may be used for implementing the frequency hopping signal, while the hopping itself is usually implemented with analog processing. An important issue in signal generation is the constant, fixed and known phase relationship of the simultaneously radiated carrier signals at the point and time of transmission. This is achieved by definition employing digital transmit signal generation. The phase relation of the transmitted signal shall be known, in order to tell that a phase variation stems from the delay of the wireless propagation channel.

Some applications related with frequency hopping radio transmitters, such as the above mentioned radio localization, for example, involve an exploitation of the overall bandwidth over all hopping frequencies in order to provide high accuracy and robustness. In order to achieve said high accuracy and robustness, the signals should be phase-coherent over all (sub) frequencies. Otherwise, the phase coherency has to be at least producible by means of a calibration, or the signal has to be at least reproducible anyhow. To achieve this goal, minimum effort is desired.

The conventional technology suggests methods wherein the coherency of signals is to be realized by means of Phase-Locked-Loops (PLLs) using a certain reference. A precise timing control (detuning of the PLL) is used to precisely adjust the phase. However, this involves a highly precise and stable reference generation (TCXO, . . . ), which is not achievable with the above desired minimum effort and relates to negligible device tolerances and sub-nanosecond switching time and jitter.

SUMMARY

An embodiment may have a receiver configured to receive, by means of a frequency hopping method, a radio signal carrying information, the radio signal including an overall frequency band $f_1$ to $f_6$ having at least three different sub carriers $f_1$, $f_2$, $f_3$, wherein the receiver is further configured to receive, during a first frequency hop interval $T_{hop1}$, a first multitone signal carrying a first portion of the radio signal, said first multitone signal including a first and a second sub carrier which are received simultaneously, determine a first phase difference $\Phi_{21}=\Phi_2-\Phi_1$ between the first and the second sub carrier of the first multitone signal, receive, during a second frequency hop interval $T_{hop2}$, a second multitone signal carrying a second portion of the radio signal, said second multitone signal including one of the first and the second sub carriers and a third sub carrier which are received simultaneously, determine a second phase difference $\Phi_{32}=\Phi_3-\Phi_2$ between the one of the first and the second sub carriers and the third sub carrier of the second multitone signal, and reconstruct a phase coherency of the radio signal by means of linking the phase differences $\Phi_{21}$ and $\Phi_{32}$ of the first and the second multitone signals.

Another embodiment may have a method for receiving, by means of a frequency hopping method, a radio signal carrying information, the radio signal including an overall frequency band $f_1$ to $f_6$ having at least three different sub carriers $f_1$, $f_2$, $f_3$, the method including receiving, during a first frequency hop interval $T_{hop1}$, a first multitone signal carrying a first portion of the radio signal, said first multitone signal including a first and a second sub carrier which are received simultaneously, determining a first phase difference $\Phi_{21}=\Phi_2-\Phi_1$ between the first and the second sub carrier of the first multitone signal, receiving, during a second frequency hop interval $T_{hop2}$, a second multitone signal carrying a second portion of the radio signal, said second multitone signal including one of the first and the second sub carriers and a third sub carrier which are received simultaneously, determining a second phase difference $\Phi_{32}=\Phi_3-\Phi_2$ between the one of the first and the second sub carriers and the third sub carrier of the second multitone signal, and reconstructing a phase coherency of the radio signal by means of linking the phase differences $\Phi_{21}$ and $\Phi_{32}$ of the first and the second multitone signals.

Another embodiment may have a non-transitory digital storage medium having a computer program stored thereon to perform the method for receiving, by means of a frequency hopping method, a radio signal carrying information, the radio signal including an overall frequency band $f_1$ to $f_6$ having at least three different sub carriers $f_1$, $f_2$, $f_3$, the method including receiving, during a first frequency hop interval $T_{hop1}$, a first multitone signal carrying a first portion of the radio signal, said first multitone signal including a first and a second sub carrier which are received simultaneously, determining a first phase difference $\Phi_{21}=\Phi_2-\Phi_1$ between the first and the second sub carrier of the first multitone signal, receiving, during a second frequency hop interval $T_{hop2}$, a second multitone signal carrying a second portion of the radio signal, said second multitone signal including one of the first and the second sub carriers and a third sub carrier which are received simultaneously, determining a second phase difference $\Phi_{32}=\Phi_3-\Phi_2$ between the one of the first and the second sub carriers and the third sub carrier of the second multitone signal, and reconstructing a phase coherency of the radio signal by means of linking the phase differences $\Phi_{21}$ and $\Phi_{32}$ of the first and the second multitone signals, when said computer program is run by a computer.

According to another embodiment, a wireless communication network may include an inventive receiver of and a transmitter.

It is an advantage of the inventive concept that the transmission units and the receiving units may be realized in a simple technical fashion, since they do not need a phase coherency over the frequency hops while, nevertheless, allowing for a full gain in bandwidth.

A further advantage of the present invention is the utilization of the spectrum, which utilization is adapted to the multipath-and-interference-structure. This utilization allows for quality measures for a sensor fusion and for an optimization of accuracy and/or robustness. Robustness is to be understood as robustness with respect to multipath propagation and interference as well as to clock and carrier mismatches device tolerances (frequency and phase offsets).

BRIEF DESCRIPTION OF THE DRAWINGS

Embodiments of the present invention will be detailed subsequently referring to the appended drawings, in which.

DETAILED DESCRIPTION OF THE INVENTION

In the following, preferred embodiments of the present invention are described in further detail with reference to the enclosed drawings in which elements having the same or similar function are referenced by the same reference signs.

Figure 1:
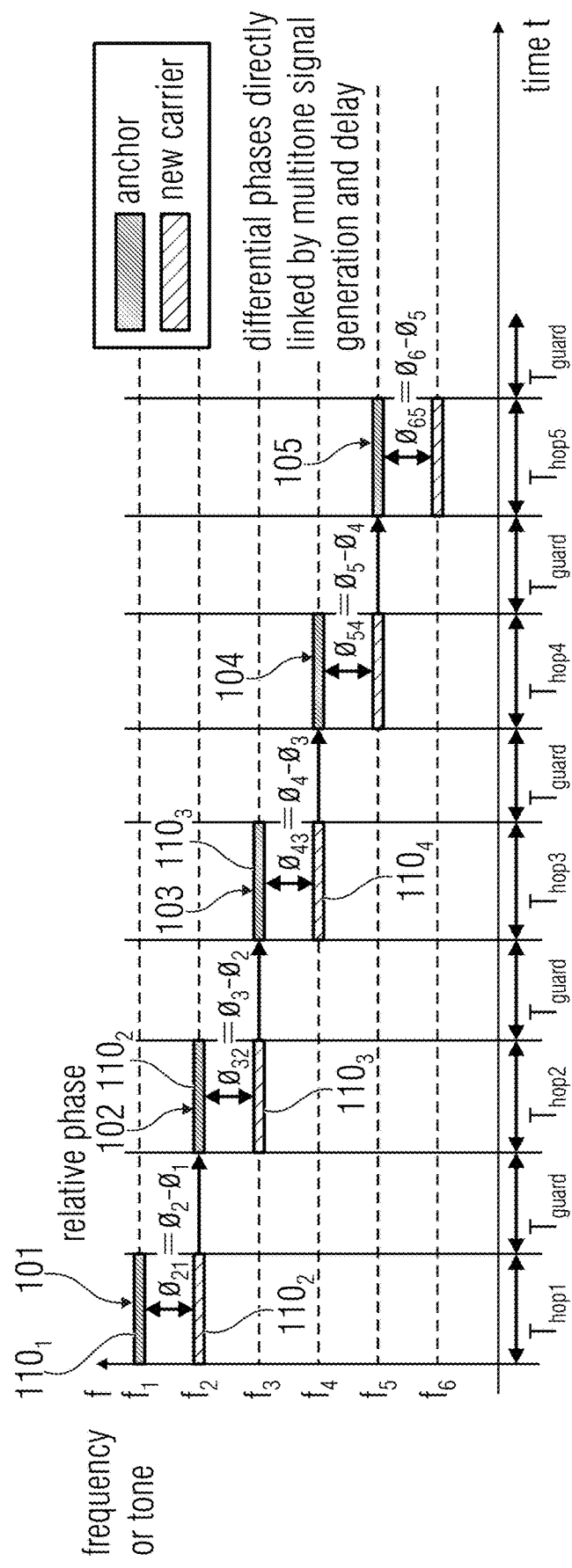
FIG. 1 shows a frequency diagram of multitone signals that may be received with an inventive receiver according to an example, wherein phase anchorings over the frequency hops of two-tone signals are exemplarily depicted.

FIG. 1 shows, based on a frequency diagram, the internal procedures within an inventive receiver. The inventive receiver is configured to receive a radio signal carrying information. Said radio signal is transmitted and received by means of frequency hopping methods. Accordingly, the radio signal comprises an overall frequency band that is represented in the diagram shown in FIG. 1 by the y-axis. The overall frequency band comprises at least three different sub carriers $f_1$, $f_2$, $f_3$.

The inventive receiver is configured to receive, during a first time period $T_{hop1}$, a first multitone signal 101 carrying a first portion of the overall radio signal. The multitone signal 101 comprises a first sub carrier $110_1$ ($f_1$) and a second sub carrier $110_2$ ($f_2$) with a known phase relation at point and time of transmission. The sub carriers $110_1$, $110_2$ may also be referred to as single tones. Generally, a multitone signal comprises at least two single tones. Each single tone $110_1$, $110_2$ may carry a modulated signal portion of the overall radio signal.

Each single tone or sub carrier $110_1$, $110_2$ at the receiver may comprise a certain phase $\Phi$. Here, the phase of the first sub carrier $110_1$ is referenced by $\Phi_1$ while the phase of the second sub carrier $110_2$ is referenced by $\Phi_2$. The phases $\Phi_1$ and $\Phi_2$ may comprise a relative phase difference or phase offset $\Delta\Phi$.

The inventive receiver is configured to determine a first phase difference $\Phi_{21}$ between the phase $\Phi_1$ of the first sub carrier $110_1$ and the second phase $\Phi_2$ of the second sub carrier $110_2$. Accordingly, the relative phase difference between the first and the second sub carriers $110_1$, $110_2$ is $\Delta\Phi_{21}=\Phi_2-\Phi_1$.

The inventive receiver is further configured to receive, during a second time period $T_{hop2}$, a second multitone signal 102 carrying a second portion of the overall radio signal. The second multitone signal 102 also comprises at least two sub carriers, namely the second sub carrier $110_2$ and a further, i.e. a third sub carrier $110_3$.

According to the invention, the second multitone signal 102 comprises at least one sub carrier that is also contained in the first multitone signal 101.

In the example shown in FIG. 1, the first multitone signal 101 and the second multitone signal 102 both comprise the above introduced second sub carrier $110_2$. Accordingly, the second sub carrier $110_2$ ($f_2$) of the first multitone signal 101 is the same as the second sub carrier $110_2$ ($f_2$) of the second multitone signal 102.

The inventive receiver is further configured to determine a second phase difference $\Phi_{32}$ of the phases $\Phi_2$, $\Phi_3$ of the single tones $110_2$, $110_3$ contained in the second multitone signal 102. Accordingly, the receiver is configured to determine a second phase difference $\Phi_{32}$ between the phase $\Phi_2$ of the second sub carrier $110_2$ and the phase $\Phi_3$ of the third sub carrier $110_3$ contained in the second multitone signal 102.

According to the invention, the receiver may reconstruct a phase coherency of the overall radio signal by means of linking the previously mentioned phases or phase differences $\Phi_{21}$, $\Phi_{32}$ of the multitone signals 101, 102. Therefore, the receiver is configured to determine a phase difference $\Phi_{31}$ between the first and the third sub carrier $110_1$, $110_3$ using the first and the second phase differences $\Phi_{21}$, $\Phi_{32}$.

The receiver may do so by setting the phase of one of the sub carriers $110_1$, $110_2$, $110_3$ as a reference phase. In the example shown in FIG. 1, the phase $\Phi_1$ of the first sub carrier $110_1$ is taken as the reference phase.

As mentioned above, an important issue in signal generation is the constant, fixed and known phase relationship of the simultaneously radiated carrier signals ($110_1$, $110_2$, $110_3$) at the point and time of transmission. This is achieved by definition employing digital transmit signal generation. The phase relation of the transmitted signal shall be known, in order to tell that a phase variation stems from the delay of the wireless propagation channel. Accordingly, at least the first and the second sub carriers ($110_1$, $110_2$) of the first multitone signal (101) comprise a known phase relation at point and time of transmission.

The phases of the single tones $110_1$, $110_2$ contained in the multitone signal 101 are directly linked with each other by multitone signal generation. However, the phases between several multitone signals 101, 102 may deviate from each other.

However, in order to solve said problem, the above mentioned reference phase $\Phi_1$ of the first tone $110_1$ of the first multitone signal 101 serves a reference phase in order to coherently align the phases of all of the other multitone signals 102, 103, 104, 105.

The inventive receiver may do so in that at least one single tone $110_2$ contained in a multitone signal 101 is the same as a single tone $110_2$ contained in one or more subsequent multitone signals 102. This common single tone $110_2$ serves as an anchor or link between the two multitone signals 101, 102 such that a phase relation between the phases of the first and the second multitone signals 101, 102 may be created.

Accordingly, since the phase $\Phi_2$ is known for both the first multitone signal 101 and the second multitone signal 102, the (possibly deviating) phases of the first and the second multitone signals 101, 102 may be coherently aligned by means of the commonly contained second sub carrier 110₂.

The mathematical background of said concatenation of the phases of the first and second multitone signals 101, 102 shall be briefly explained in the following.

Components and Methods of the Invention

As mentioned above, the multitone signals 101, 102 are transmitted and received by means of a frequency hopping method. However, a mere frequency hopping method may have the disadvantage that in most of the transceivers new phases $\phi_{TXLO,k}$ (transmitter side) and $\phi_{RXLO,ki}$ (receiver side) occur randomly during retuning to the new frequency $f_k$, such that the phase relations may not be correctly analyzed anymore.

The present invention addresses this aspect in that the frequency hopping transmitter transmits two signals (i.e. signal portions of the radio signal) simultaneously at several sub carriers, e.g. 110₁, 110₂, and with the same or at least known phase. Now, the phase differences from two subsequent frequency hops $T_{hop1}$, $T_{hop2}$ may be mutually analyzed in a quasi-coherent manner, when at least one 110₂ of the sub carriers is transmitted in both frequency hop intervals $T_{hop1}$, $T_{hop2}$. The mutual sub carrier 110₂ therefore serves the purpose of anchoring or linking the phase relations. For more than two frequency hop intervals, a plurality of virtually chained measurements may be generated $$\exp(j\Delta\phi_{i,11})=1$$

$$\exp(j\Delta\phi_{i,12})=\exp(j(\phi_{i,2}-\phi_{i,1}))$$

$$\exp(j\Delta\phi_{i,13})=\exp(j\Delta\phi_{i,23})\exp(j\Delta\phi_{i,12})=\exp(j(\phi_{i,3}-\phi_{i,2}))\exp(j(\phi_{i,2}-\phi_{i,1}))$$

$$\exp(j\Delta\phi_{i,14})=\exp(j\Delta\phi_{i,34})\exp(j\Delta\phi_{i,23})\exp(j\Delta\phi_{i,12})=\exp(j\Delta\phi_{i,24})\exp(j\Delta\phi_{i,12})$$

The result is a desired discrete sampling of the channel phase $\phi_{i,k}=2\pi f_k \tau_i$ in the frequency domain. If needed, the channel amplitude $\beta_{i,k}$ to be measured may be included (channel $h_{i,k}=\beta_{i,k}\exp(j\phi_{i,k})$). It is an advantage of this chained method that the local phase change resulting from the frequency hop is not measured here.

Stated in different words, in the present invention a (modulated) multitone signal may be used as a frequency hopping signal. Based on at least two carriers, the signal processor in the receiver may move hand over hand in a sequential manner through non-coherent frequency hops $T_{hop1}$, $T_{hop2}$. There is one component 110₂ serving as a reference for anchoring with the previously (or subsequently) transmitted carriers in order to compensate for the missing phase coherency (i.e. the independent phases).

As can be seen in FIG. 1, there may be further multitone signals 103, 104, 105 spread over the overall frequency band $f_1$ to $f_6$. The inventive principle that has been explained above on the example of two multitone signals 101, 102 is also valid for a plurality of multitone signals 101 to 105.

Each multitone signal 101 to 105 is linked with at least one further multitone signal 101 to 105 by at least one mutual sub carrier. For example, the second and third multitone signals 102, 103 share the third sub carrier $f_3$, the third and the fourth multitone signals 103, 104 share the fourth sub carrier $f_4$, and the fourth and fifth multitone signals 104, 105 share the fifth sub carrier $f_5$.

In the example shown in FIG. 1, a relative spectral distance between the first and the second sub carriers 110₁, 110₂ of the first multitone signal 101 is equal to a relative spectral distance between the second and the third sub carriers 110₂, 110₃ of the second multitone signal 102.

As can be seen in FIG. 1, each of the multitone signals 101 to 105 comprise the same spectral distance between their respective two sub carriers.

According to an example, the receiver is configured to receive the second multitone signal 102, in the time domain, directly subsequent to the first multitone signal 101. Due to the fact that the sub carriers 110₁, 110₂, 110₃ of the first and second multitone signals 101, 102 comprise the same spectral distance, and due to the fact that the two multitone signals 101, 102 share one mutual sub carrier 110₂, the first and the second multitone signals 101, 102 create a frequency staircase pattern as shown in FIG. 1.

Figure 2:
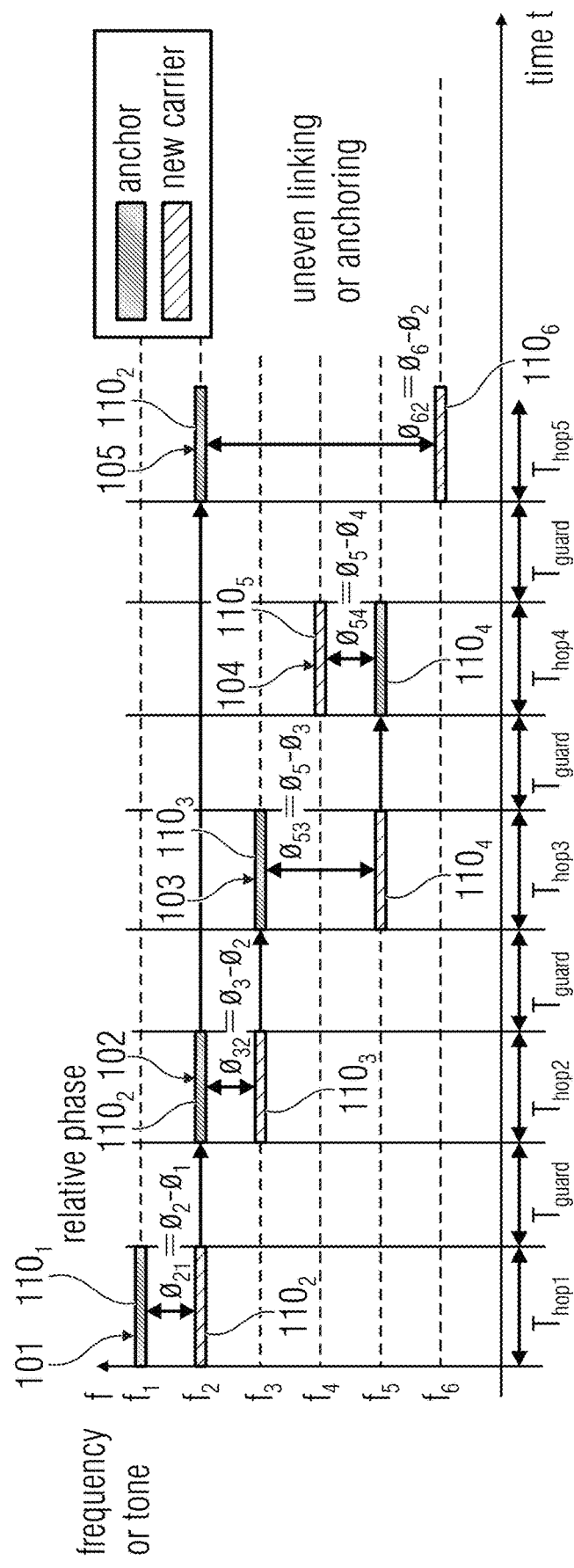
FIG. 2 shows a further frequency diagram of multitone signals that may be received with an inventive receiver according to a further example, wherein a linked phase anchoring at different basic tones is exemplarily depicted.

If the spectral distances between sub carriers of one multitone signal and its subsequent multitone signal may not be the same, the resulting frequency pattern will not be a perfect frequency staircase. Such an example is shown in FIG. 2 when looking at the second multitone signal 102 and the subsequent third multitone signal 103. However, FIG. 2 will be described in more detail afterwards.

Referring back to FIG. 1, it was already mentioned that the inventive receiver may be configured to receive a plurality of frequency hopping multitone signals 101 to 105.

Thus, according to an example, the inventive receiver may be configured to receive, during a third time period $T_{hop3}$, a third multitone signal 103 carrying a third portion of the overall radio signal. Said third multitone signal 103 comprises the third sub carrier 110₃ and a fourth sub carrier 110₄ which are received simultaneously. The receiver may further be configured to determine a third phase difference $\Phi_{43}$ between the third and the fourth sub carrier 110₃, 110₄ and to determine a phase difference $\Phi_{41}$ between the first and the fourth sub carrier 110₁, 110₄ using the previously determined first, second and third phase differences $\Phi_{21}$, $\Phi_{32}$, $\Phi_{43}$.

This example may also be valid for the depicted fourth and fifth multitone signals 104, 105. Generally speaking, the above described example may be valid for a plurality of multitone signals. Accordingly, the receiver may be configured to receive a plurality of such frequency hopping multitone signals 101 to 105.

According to an example, a relative spectral distance between the first and the second sub carrier 110₁, 110₂ of the first multitone signal 101 is equal to a relative spectral distance between the second and the third sub carrier 110₂, 110₃ of the second multitone signal 102 and equal to a relative spectral difference between the third and the fourth sub carrier 110₃, 110₄ of the third multitone signal 103.

Accordingly, the spectral distance between the sub carriers or single tones contained in each of a plurality of multitone signals is equal in the frequency domain, independent from their time of arrival at the receiver in the time domain. That is, the first, the second and the third multitone signals 101, 102, 103 may arrive randomly at the receiver.

According to a further example, the receiver may be configured to receive, in the time domain, the first, the second and the third multitone signals 101, 102, 103 consecutively such that the second multitone signal 102 is received directly subsequent to the first multitone signal 101, and the third multitone signal 103 is received directly subsequent to the second multitone signal 102.

Accordingly, the first, the second and the third multitone signals 101, 102, 103 are received sequentially or consecutively in time, i.e. one after the other.

Provided that the multitone signals furthermore comprise the same spectral distances, as mentioned above, the frequency staircase pattern as shown in FIG. 1 results, where the system bandwidth may be optimally exploited. This example is not limited to only or exactly three multitone signals but it may also be valid for a plurality of multitone signals comprising three or more such multitone signals.

Summarizing, FIG. 1 shows an exemplary basic configuration of the signal structure with a double frequency staircase that covers the entire usable frequency spectrum $f_1$ to $f_6$ with a constant spectral hopping distance of $\Delta f$. The respective hopping distance $\Delta f = f_{m+1} - f_m$ exactly corresponds to the distance of the K sub carriers. Accordingly, all tones together cover the overall frequency range $B_{overall} = (K-1) \Delta f + B_{signal}$, wherein $B_{signal}$ is the bandwidth of the modulated tone on each sub carrier. Advantages of this embodiment are:

- short settling times of the frequency generating circuit in analog realization (e.g. as phase-locked-loop; PLL) by small frequency hops during tuning or detuning
- a constant distance of the tones within a hop allows for a simple realization of this signal
    - in the analog domain, e.g. by means of mixed sine or cosine signals
    - in the digital domain, e.g. by means of modulation of an alternating bipolar sequence (binary phase modulation; BPSK) or onto a basic carrier (a center frequency) like for MBOC-signals
- a suitable choice of the frequencies allows for a simple derivation of the distances of the carrier and the sub carrier from a common reference oscillator (shared basis)
- a minimum bandwidth requirement $B_{system} = B_{hop} = \Delta f + B_{signal}$ for each frequency hop and, hence, the analog realization.

The invention is, however, not limited to the depicted way of signal generation. Furthermore, a frequency staircase may be realized in a descending or an ascending way.

If the spectral distances between sub carriers of one multitone signal and its subsequent multitone signal may not be the same, the resulting frequency pattern will not be a perfect frequency staircase. Such an example is shown in FIG. 2 when looking, for example, at the second multitone signal 102 and the subsequent third multitone signal 103.

In particular, the second multitone signal 102 comprises the second sub carrier $110_2$ and the third sub carrier $110_3$. The spectral distance between the second sub carrier $110_2$ and the third sub carrier $110_3$ is exactly one spectral frequency distance, i.e. the distance between $f_2$ and $f_3$.

The third multitone signal 103 comprises the third sub carrier $110_3$ and a fourth sub carrier $110_4$ as explained above with reference to FIG. 1. However, the difference to FIG. 1 is, that the spectral distance between the third sub carrier $110_3$ and the fourth sub carrier $110_4$ is more than one spectral frequency distance. In particular, the spectral distance between the third sub carrier $110_3$ and the fourth sub carrier $110_4$ is two frequency distances, namely the distance between $f_3$ and $f_5$. Accordingly, the fourth sub carrier $110_4$ is located at frequency $f_5$. Again, in FIG. 1, the fourth sub carrier $110_4$ was located at frequency $f_4$.

Since the spectral distance between the third sub carrier $110_3$ and the fourth sub carrier $110_4$ of the third multitone signal 103 differs from the spectral distance between the third sub carrier $110_3$ and the second sub carrier $110_2$ of the second multitone signal 102, the resulting frequency pattern may not be a perfect frequency staircase.

Generally, the spectral distance between the sub carriers within one multitone signal may spread over one or more frequency distances. For example, the fifth multitone signal 105 comprises two sub carriers $110_2$, $110_6$ that spread over a spectral frequency distance of four frequency distances, namely from $f_2$ to $f_6$.

According to an example, spectral frequency distances between the at least three different sub carriers $f_1$, $f_2$, $f_3$ in the overall frequency band are equal, and a relative spectral distance between the sub carriers $110_1$, $110_2$ contained in one multitone signal 101 is an integer multiple of the spectral frequency distances of the overall frequency band.

However, what is more interesting at the fifth multitone signal 105 is the fact that it is not linked to its directly preceding fourth multitone signal 104. Instead, the fifth multitone signal 105 is linked or anchored to the second multitone signal 102 because both the second and the fifth multitone signals 102, 105 mutually share the second sub carrier $110_2$.

According to a further example, the frequency $f_1$ of the first sub carrier $110_1$ is higher than the frequency $f_2$ of the second sub carrier $110_2$, and the frequency $f_2$ of the second sub carrier $110_2$ is higher than the frequency $f_3$ of the third sub carrier $110_3$.

With this in mind, a further example shall be described by referring to the fourth multitone signal 104. As can be seen in FIG. 2, in each of the first, the second, the third and the fifth multitone signal 101, 102, 103, 105 the respective single tone comprising the higher frequency serves as an anchor. In the fourth multitone signal 104, however, the single tone $110_4$ comprising the lower frequency (compared to $110_5$) serves as an anchor.

Accordingly, FIG. 2 shows a distribution of the frequencies which comprise uneven hops and distances. Even the frequency pattern may be unevenly distributed throughout the used frequency band.

Until now, examples have been described according to which multitone signals sharing a common sub carrier were received subsequently, i.e. one after the other, in the time domain.

Figure 3:
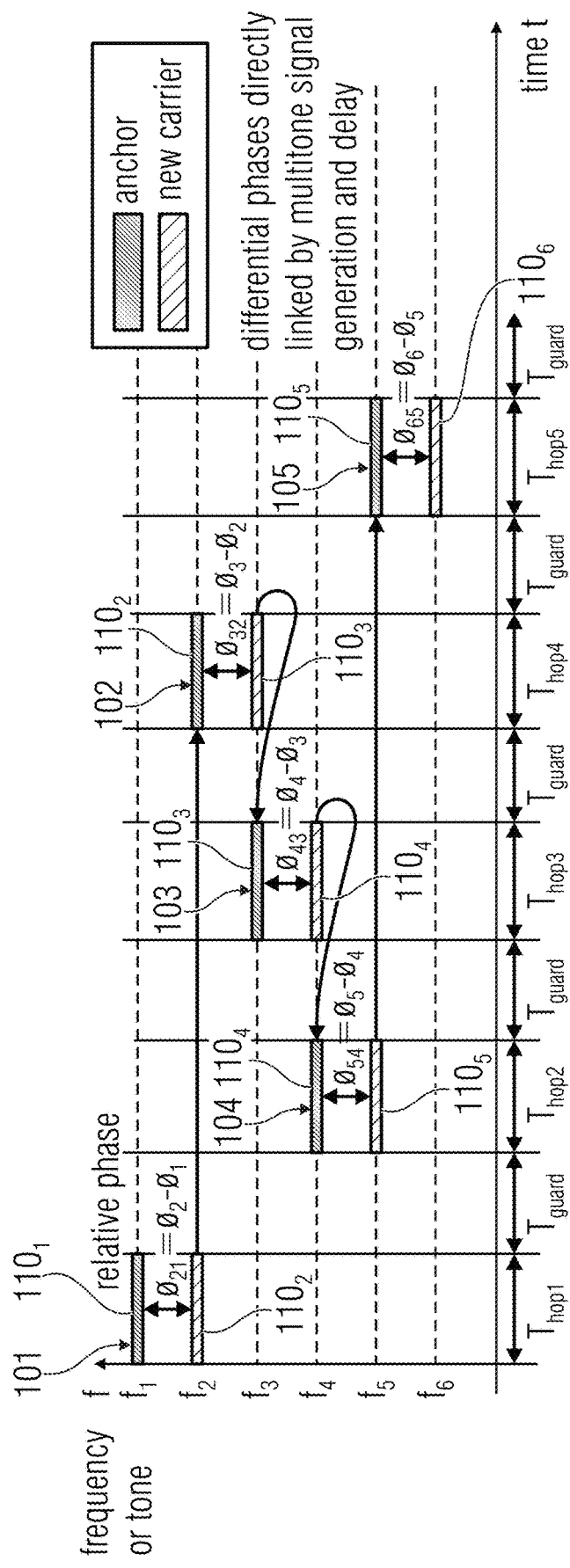
FIG. 3 shows a further frequency diagram of multitone signals that may be received with an inventive receiver according to a further example, wherein a timely non sequential frequency staircase pattern is exemplarily depicted.

However, referring to FIG. 3, a further example is shown in which the linked multitone signals are received at different time periods and sorted afterwards.

As can be seen in FIG. 3, the first multitone signal 101 is linked to the second multitone signal 102 by anchor $110_2$, i.e. by sub carrier $110_2$. The second multitone signal 102 is linked to the third multitone signal 103 by anchor $110_3$, i.e. by sub carrier $110_3$. The third multitone signal 103 is linked to the fourth multitone signal 104 by anchor $110_4$, i.e. by sub carrier $110_4$. The fourth multitone signal 104 is linked to the fifth multitone signal 105 by anchor $110_5$, i.e. by sub carrier $110_5$.

However, when viewed in the time domain, it can be seen that the fourth multitone signal 104 is received subsequently in time after the first multitone signal 101, the third multitone signal 103 is received subsequently in time after the fourth multitone signal 104, the second multitone signal 102 is received subsequently in time after the third multitone signal 103, and the fifth multitone signal 105 is received subsequently in time after the second multitone signal 102.

Accordingly, the first, the second, the third, the fourth and the fifth multitone signals 101 to 105 are received non-consecutively in the time domain, but rather randomized. However, the overall phase coherency may only be calculated when all of the anchored or linked multitone signals 101 to 105 have been received.

As an example, in order to determine the phase difference between the first sub carrier $110_1$ and the fourth sub carrier $110_4$, the receiver has to wait for the arrival of the first multitone signal 101, the linked second multitone signal 102 and the linked third multitone signal 103. Only then, i.e. after receipt of each linked multitone signal 101, 102, 103, the overall phase coherency may be reconstructed.

Thus, according to an example, the receiver may be configured to receive, in the time domain, the first, the second and the third multitone signal 101, 102, 103 non-consecutively such that the multitone signals 101, 102, 103 are received in a randomized sequence. And the receiver may further be configured to determine the phase difference between the first and the fourth sub carrier $110_1$, $110_4$ after receipt of the first, the second and the third multitone signals 101, 102, 103.

As can further be seen in FIG. 3, a frequency staircase may also be created in a timely non-strictly sequential way but it may deviate from the order shown in FIG. 3, such that a linking or anchoring of the phases happens afterwards, i.e. only after re-sorting. However, in this case, the advantage of the shorter settling times during the synthesis of the center frequency may not be longer applicable.

An advantage of differently used carrier sequences may be a possible timely parallel multi user operation (Multiple Access) of multiple transmitters to be located [timor82], such as, e.g., for multiple Bluetooth-cells in a room with a broadband receiver recording the full frequency band for subsequent detection of users and propagation delays.

Figure 4:
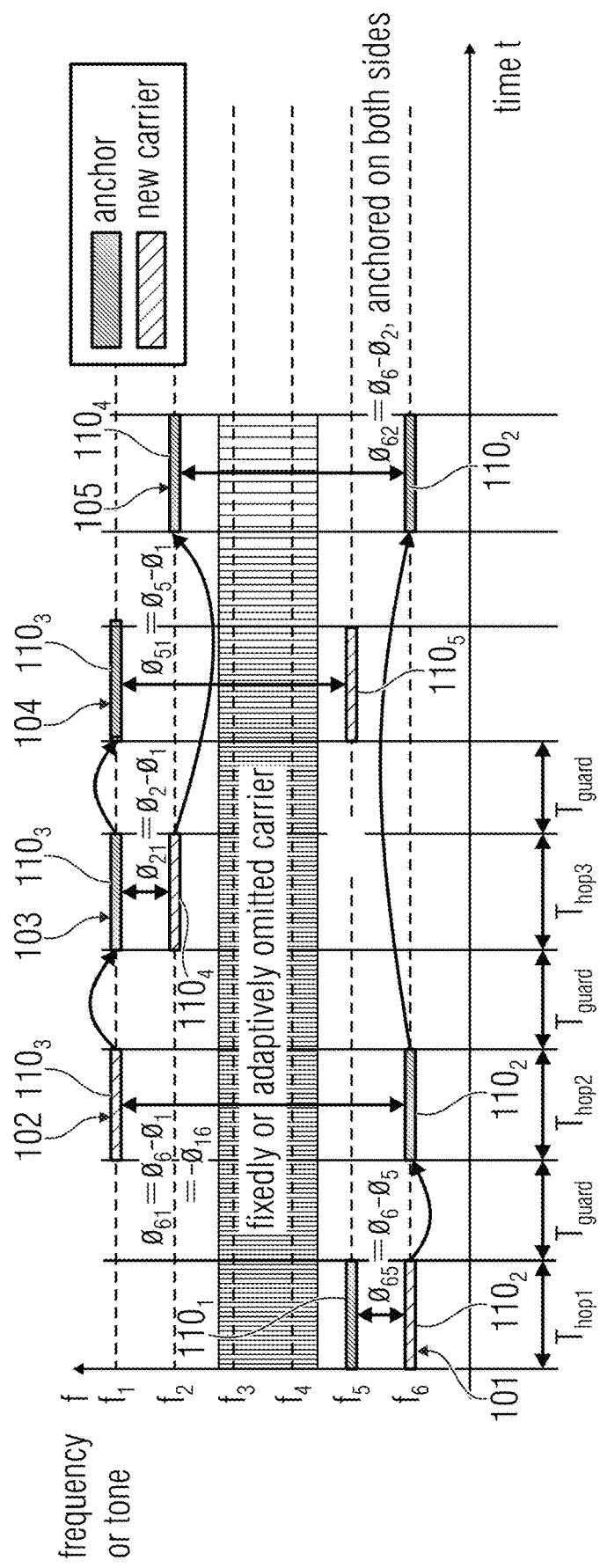
FIG. 4 shows a further frequency diagram of multitone signals that may be received with an inventive receiver according to a further example, wherein a linked phase anchoring with fixed or adaptively omitted sub carriers is exemplarily depicted.

FIG. 4 shows a further example in which all of the above described examples of multitones are shown together in one frequency pattern.

In particular, the first multitone signal 101 may comprise a first sub carrier $110_1$ (at $f_5$) and a second sub carrier $110_2$ (at $f_6$).

The second multitone signal 102 may comprise the second sub carrier $110_2$ (at $f_6$) and a third sub carrier $110_3$ (at $f_1$).

The third multitone signal 103 may comprise the third sub carrier $110_3$ (at $f_1$) and a fourth sub carrier $110_4$ (at $f_2$).

The fourth multitone signal 104 may comprise the third sub carrier $110_3$ (at $f_1$) and a fifth sub carrier $110_5$ (at $f_5$).

The fifth multitone signal 105 may comprise the fourth sub carrier $110_4$ (at $f_2$) and the second sub carrier $110_2$ (at $f_6$).

Accordingly, the fifth multitone signal 105 is anchored on both sides, i.e. the fifth multitone signal 105 shares one of its sub carriers, namely sub carrier $110_4$, with the third multitone signal 103 and the other sub carrier $110_2$ with the second multitone signal 102.

FIG. 4 shows a further aspect of the invention. According to this further aspect, the inventive receiver may be configured to fixedly or adaptively omit at least one sub carrier.

As can be seen in FIG. 4, each of the multitone signals 101 to 105 may comprise sub carriers that are spread over the frequency range of the overall frequency spectrum. However, the frequency $f_3$ and the frequency $f_4$ are not occupied. In other words, these sub carriers do not carry any signal portions or information.

Thus, these sub carriers, i.e. the frequencies $f_3$ and $f_4$, are selected as signal-free sub carriers on which the receiver does not receive any multitone signals.

According to an example, the receiver may be configured to select at least one sub carrier $f_3$, $f_4$ within the overall frequency band $f_1$ to $f_6$ as a signal-free sub carrier on which the receiver does not receive any multitone signals.

According to a further example, the receiver may be configured to select the signal-free sub carrier $f_2$, $f_3$ prior to receiving the multitone signals of the overall radio signal, or the receiver may select the signal-free sub carrier $f_2$, $f_3$ adaptively during the receipt of the radio signal, i.e. during operation.

The uneven patterns as shown in FIGS. 2, 3 and 4 allow for a selectively adaptively usage of the spectrum, such as shown exemplarily in FIG. 4. Therein, a frequency range $f_3$ to $f_4$ (or several frequency ranges) are omitted. This may be determined in advance, or it may be determined adaptively, i.e. during operation. Conditions are:
keep channel utilization low at high spectral coverage
omit sub carriers with known or measured interference
an adaptive adaptation to the transmission channel
for dominant direct path—concentration of the hopping frequencies onto the band edges
even coverage of the spectrum at high multi path propagation.

The adaptive adaptation may be realized based on different criteria:
channel measurements of the transmitter
measurements of the receiver.

If the analog system bandwidth is limited so that a joint simultaneous transmission of a first sub carrier and a second sub carrier is not feasible to bridge the omitted sub carriers, the receiver may base its further processing, e.g. time of arrival estimation, on the two independent spectral portions. This loses the joint phase information and, thus, the full broadband gain, but still increases the resolution and accuracy of any channel estimates like phases, magnitudes and ToAs.

It may also be a viable solution not to estimate the ToA at all, but directly employ the estimated channel phases from multiple receivers to conclude on a position in terms of phase differences of arrival.

A double-sided linkage or anchoring, such as shown for the above mentioned fifth multitone signal 105 in FIG. 4, generally enlarges the reliability of the anchoring. However, it should be avoided due to overdeterminacy of the equation system.

Figure 5:
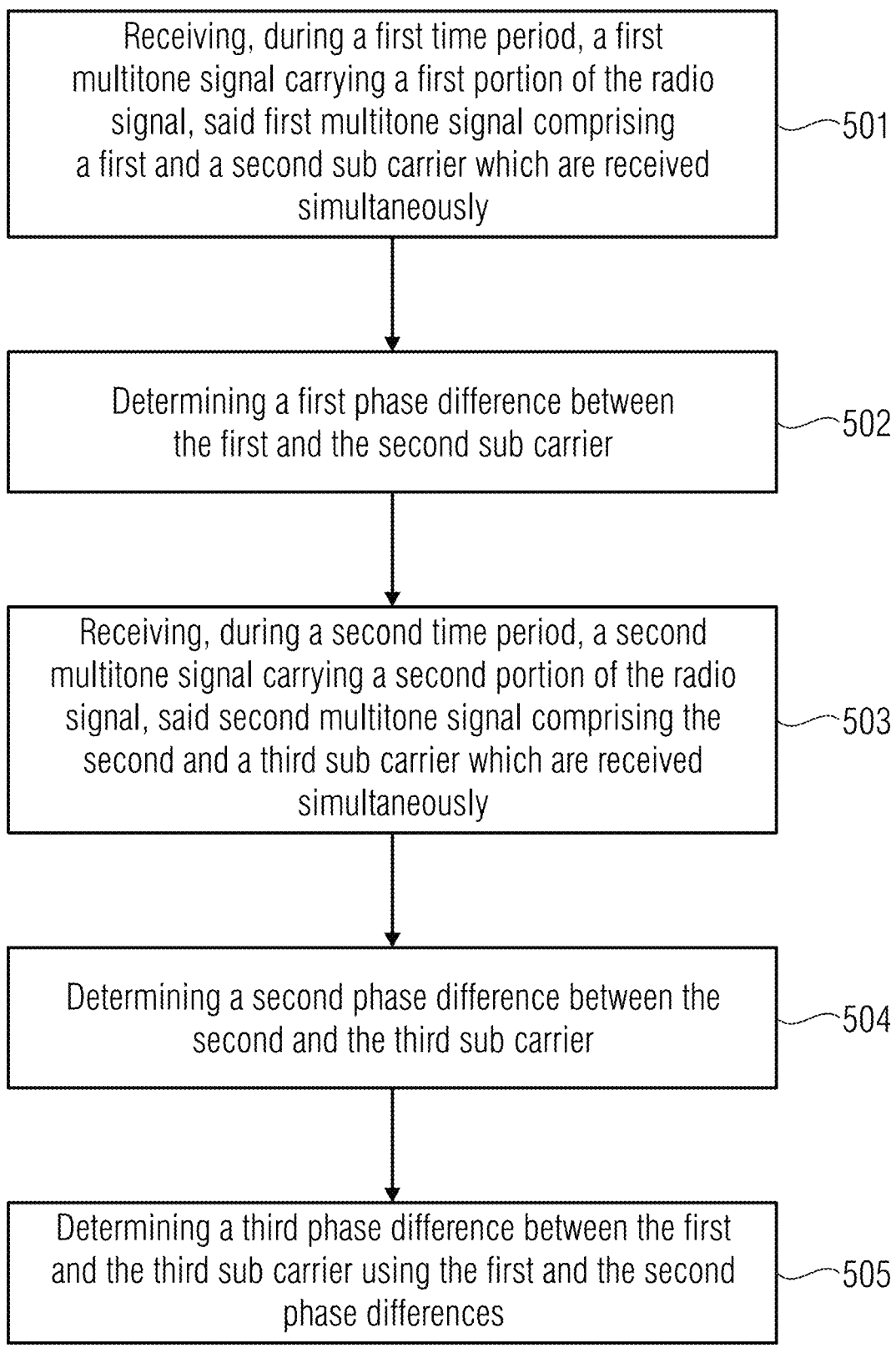
FIG. 5 shows a block diagram of an inventive method according to an example.

FIG. 5 shows a block diagram illustrating a method according to the present invention, which method is related to the above described examples.

In block 501, a first multitone signal carrying a first portion of the radio signal is received during a first time period, said first multitone signal comprising a first and a second sub carrier which are received simultaneously.

In block 502, a first phase difference between the first and the second sub carrier is determined.

In block 503, a second multitone signal carrying a second portion of the radio signal is received during a second time period, said second multitone signal comprising the second and a third sub carrier which are received simultaneously.

In block 504, a second phase difference between the second and the third sub carrier is determined.

In block 505, a third phase difference between the first and the third sub carrier is determined using the first and the second phase differences.

Figure 6:
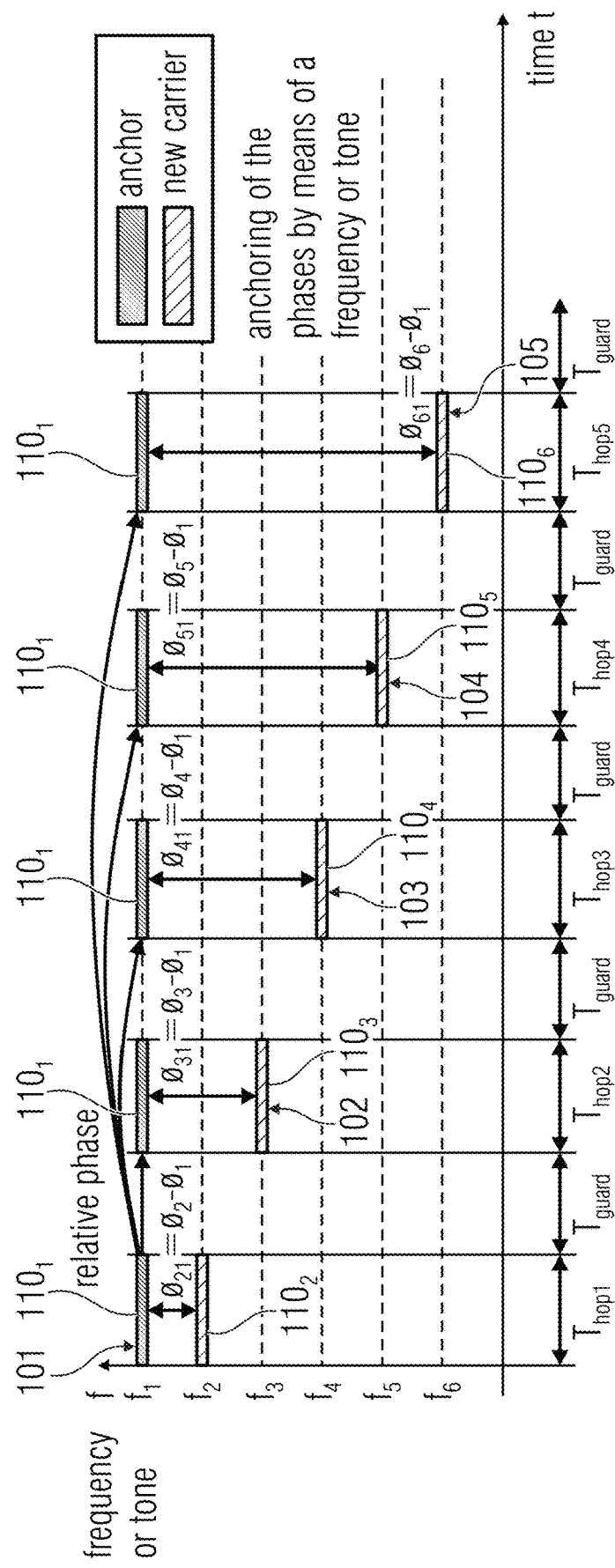
FIG. 6 shows a further frequency diagram of multitone signals that may be received with an inventive receiver according to a further example, wherein a continuous anchoring at one basic tone (here: $f_1$) with linearly rising second tone is exemplarily depicted.

A further example of an inventive receiver is shown in FIG. 6. While the previously described embodiments showed examples in which different or random sub carriers may have been chosen as the linking sub carrier, or anchor, the example of FIG. 6 uses the same sub carrier as an anchor for anchoring or linking each of the multitones.

As can be seen, the first multitone signal 101 comprises a first and a second sub carrier $110_1$, $110_2$.

The second multitone signal 102 comprises a third sub carrier $110_3$ and also the first sub carrier $110_1$ that serves as the anchor.

The third multitone signal 103 comprises a fourth sub carrier $110_4$ and also the first sub carrier $110_1$ that serves as the anchor.

The fourth multitone signal 104 comprises a fifth sub carrier $110_5$ and also the first sub carrier $110_1$ that serves as the anchor.

The fifth multitone signal 105 comprises a sixth sub carrier $110_6$ and also the first sub carrier $110_1$ that serves as the anchor.

According to this aspect, the invention concerns a receiver configured to receive a radio signal carrying information, the radio signal comprising an overall frequency band $f_1$ to $f_6$ having at least three different sub carriers $f_1$, $f_2$, $f_3$. The receiver is further configured to receive, during a first time period $T_{hop1}$, a first multitone signal 101 carrying a first portion of the radio signal, said first multitone signal comprising a first and a second sub carrier $110_1$, $110_2$ which are received simultaneously.

The inventive receiver is further configured to determine a first phase difference $\Phi_{21}$ between the first and the second sub carrier $110_1$, $110_2$.

The inventive receiver is further configured to receive, during a second time period $T_{hop2}$, a second multitone signal 102 carrying a second portion of the radio signal, said second multitone signal 102 comprising the first sub carrier $110_1$ and a third sub carrier $110_3$ which are received simultaneously.

According to the invention, the receiver is further configured to determine a second phase difference $\Phi_{31}$ between the first and the third sub carrier $110_1$, $110_3$.

As mentioned above, each of the multitone signals 101 to 105 comprise at least two single tones or sub carriers, wherein at least one sub carrier $110_1$ is contained in each of the multitone signals 101 to 105. Accordingly, this one sub carrier $110_1$ that is shared by all multitone signals 101 to 105 serves as the anchor for coherently aligning the phase of the respective other single tones contained within a multitone signal.

The spectral frequency distance between the sub carriers $f_1$ to $f_6$ is equal. Furthermore, the second single tone or sub carrier contained in each of the multitone signals 101 to 105 hops sequentially from one sub carrier to the subsequent sub carrier. For example, the first multitone signal 101 comprises a sub carrier $110_2$ with frequency $f_2$, the second multitone signal 102 comprises a sub carrier $110_3$ with frequency $f_3$, the third multitone signal 103 comprises a sub carrier $110_4$ with frequency $f_4$ and so on.

According to an example, the spectral frequency distances between the at least three different sub carriers $f_1$, $f_2$, $f_3$ in the overall frequency band $f_1$ to $f_6$ are equal. Furthermore, the relative spectral distance between the first and the second sub carrier $110_1$, $110_2$ contained in the first multitone signal 101 differs from the relative spectral distance between the first and the third sub carrier $110_1$, $110_3$ contained in the second multitone signal 102 by exactly one spectral sub carrier distance.

According to the example shown in FIG. 6, the inventive receiver may be configured to not only receive two multitone signals, but to receive a plurality of said multitone signals 101 to 105.

According to an example, the receiver may be configured to receive, during a third time period $T_{hop3}$, a third multitone signal 103 carrying a third portion of the radio signal, said third multitone signal 103 comprising the first and a fourth sub carrier $110_1$, $110_4$ which are received simultaneously. The receiver may further be configured to determine a third phase difference $\Phi_{41}$ between the first and the fourth sub carrier $110_1$, $110_4$.

This example can be extended to a plurality of multitone signals, i.e. the above example is not limited to only or exactly three different multitone signals.

As mentioned above, the spectral distances of the single tones contained within one of the sequentially received multitone signals 101 to 105 is extended by exactly one frequency distance. In other words, the hopping distance between two sequentially received multitone signals corresponds to the spectral distance between the sub carriers $f_1$ to $f_6$ spread over the overall frequency band.

Thus, the single frequency staircase pattern as shown in FIG. 6 results. It is called single frequency staircase pattern because only a single tone varies, while in the examples described above with reference to FIGS. 1 to 4, both of the single tones varied, and it was therefore called a double frequency staircase pattern.

This single frequency staircase pattern results because the hopping distance (in the frequency domain) of each of the sequentially received multitone signals (in the time domain) is equal. As an example, one can say that in the time domain, the second multitone signal 102 is received between the first and the third multitone signals 101, 103. While in the frequency domain, the third sub carrier $110_3$ contained in the second multitone signal 102 is located between the second sub carrier $110_2$ contained in the first multitone signal 101 and the fourth sub carrier $110_4$ contained in the third multitone signal 103.

Thus, according to an example, the receiver may be configured to receive the first, the second and the third multitone signals 101, 102, 103 sequentially in time one after the other, wherein the third sub carrier $110_3$ is located between the second and the fourth sub carrier $110_2$, $110_4$ in the frequency domain such that the receiver receives the multitone signals 101, 102, 103 in an ascending or a descending frequency staircase pattern.

Summarizing, FIG. 6 shows a further possibility of signal generation according to which the linkage or anchoring happens by means of one center frequency (here: $f_1$). This center frequency may, but does not necessarily have to, be located at the borders of the used frequency band. Compared to the previously described signal generation methods, broad band radio front ends or a multi channel front end in the receiver and the transmitter may be needed.

Figure 7:
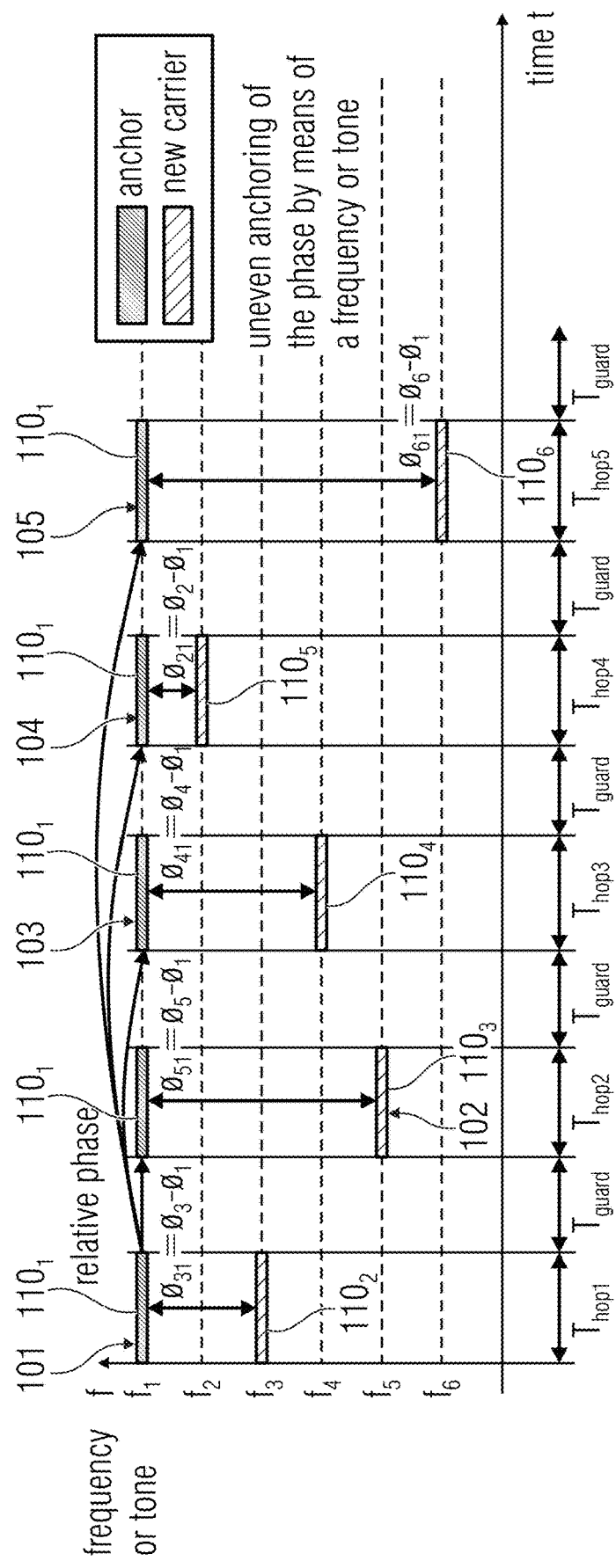
FIG. 7 shows a further frequency diagram of multitone signals that may be received with an inventive receiver according to a further example, wherein a continuous anchoring at one basic tone (here: $f_1$) with a second tone that is spectrally spread into the frequency spectrum is exemplarily depicted.

The same applies if the frequency pattern is not realized in a sequential staircase pattern, as shown in FIG. 7 which shows a further example of the present invention. This example is similar to the one described above with reference to FIG. 6. However, the difference here is that the respective second single tone of the plurality of multitone signals 101 to 105 is spread over the frequency spectrum $f_1$ to $f_6$.

As can be seen, the first multitone signal 101, the second multitone signal 102 and the third multitone signal 103 are received directly consecutively, i.e. sequentially one after the other in the time domain.

However, the spectral distances of the single tones contained within one multitone signal vary between each frequency hop.

Thus, according to an example, the spectral sub carrier distances between the at least three different sub carriers $f_1$, $f_2$, $f_3$ in the overall frequency band $f_1$ to $f_6$ are equal, but the relative spectral distance between the first and the second sub carrier $110_1$, $110_2$ contained in the first multitone signal 101 differs from the relative spectral distance between the first and the third sub carrier $110_1$, $110_3$ contained in the second multitone signal 102 by more than one spectral sub carrier distance.

Thus, the receiver may not receive a frequency staircase pattern but a rather randomized frequency pattern. One could say, the single tone that does not serve as the anchor is spread over the overall frequency band $f_1$ to $f_6$.

The order in which the respective second single tone of a multitone signal may arrive at the receiver may therefore be regarded as variable.

In other words, the receiver according to a further example may be configured to receive the first, the second and the third multitone signal 101, 102, 103, in the time domain directly consecutively, i.e. sequentially one after the other, wherein the fourth sub carrier $110_4$ is located between the second and the third sub carrier $110_2$, $110_3$ in the frequency domain.

Such an example is shown for the first, the second and the third multitone signals 101, 102, 103 depicted in FIG. 7.

However, also the third, the fourth and the fifth multitone signals 103, 104, 105 depicted in FIG. 6 may be regarded, according to the appended claims, as the first, the second and the third multitone signals.

Then, according to this example, the receiver may be configured to receive the first, the second and the third multitone signal 103, 104, 105, in the time domain directly consecutively, i.e. sequentially one after the other, wherein the second sub carrier $110_4$ is located between the third and the fourth sub carrier $110_5$, $110_6$ in the frequency domain.

Generally, the multitone signals 101 to 105 of all of the above described examples may be separated in the time domain by a guard time period $T_{guard}$.

The settling times of the frequency synthesis may determine the guard intervals $T_{guard}$. Fast settling times allow for fast switching and a better channel utilization. The selection of the guard interval may be variable but it may not go below the settling time. Furthermore, the respective duration of a guard interval should be known to the receiver.

Figure 8:
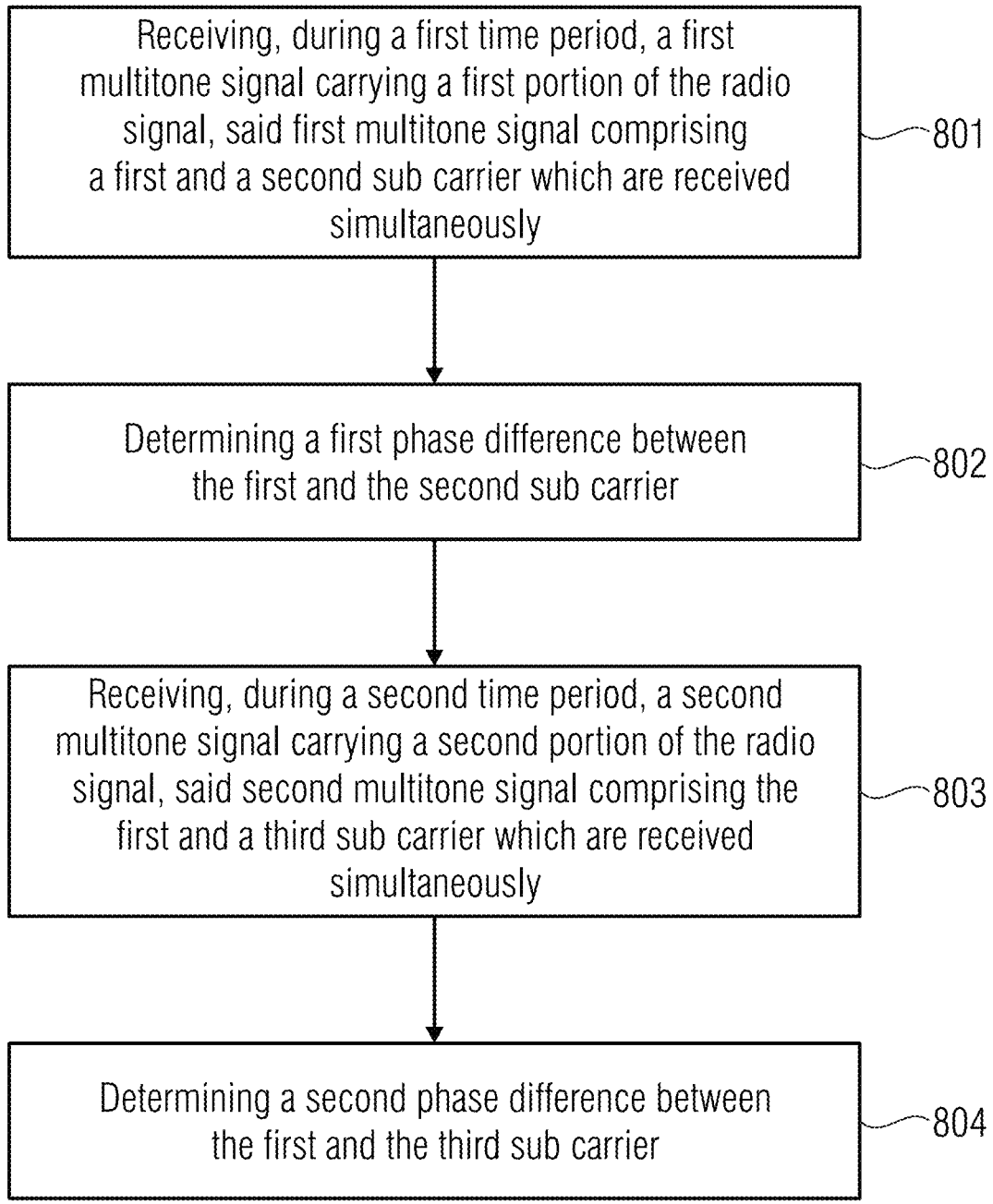
FIG. 8 shows a block diagram of an inventive method according to a further example.

FIG. 8 shows a block diagram illustrating a method according to the present invention, which method is related to the above described examples.

In block 801, a first multitone signal carrying a first portion of the radio signal is received during a first time period, said first multitone signal comprising a first and a second sub carrier which are received simultaneously.

In block 802, a first phase difference between the first and the second sub carrier is determined.

In block 803, a second multitone signal carrying a second portion of the radio signal is received during a second time period, said second multitone signal comprising the first and a third sub carrier which are received simultaneously.

In block 804, a second phase difference between the first and the third sub carrier is determined.

Figure 9:
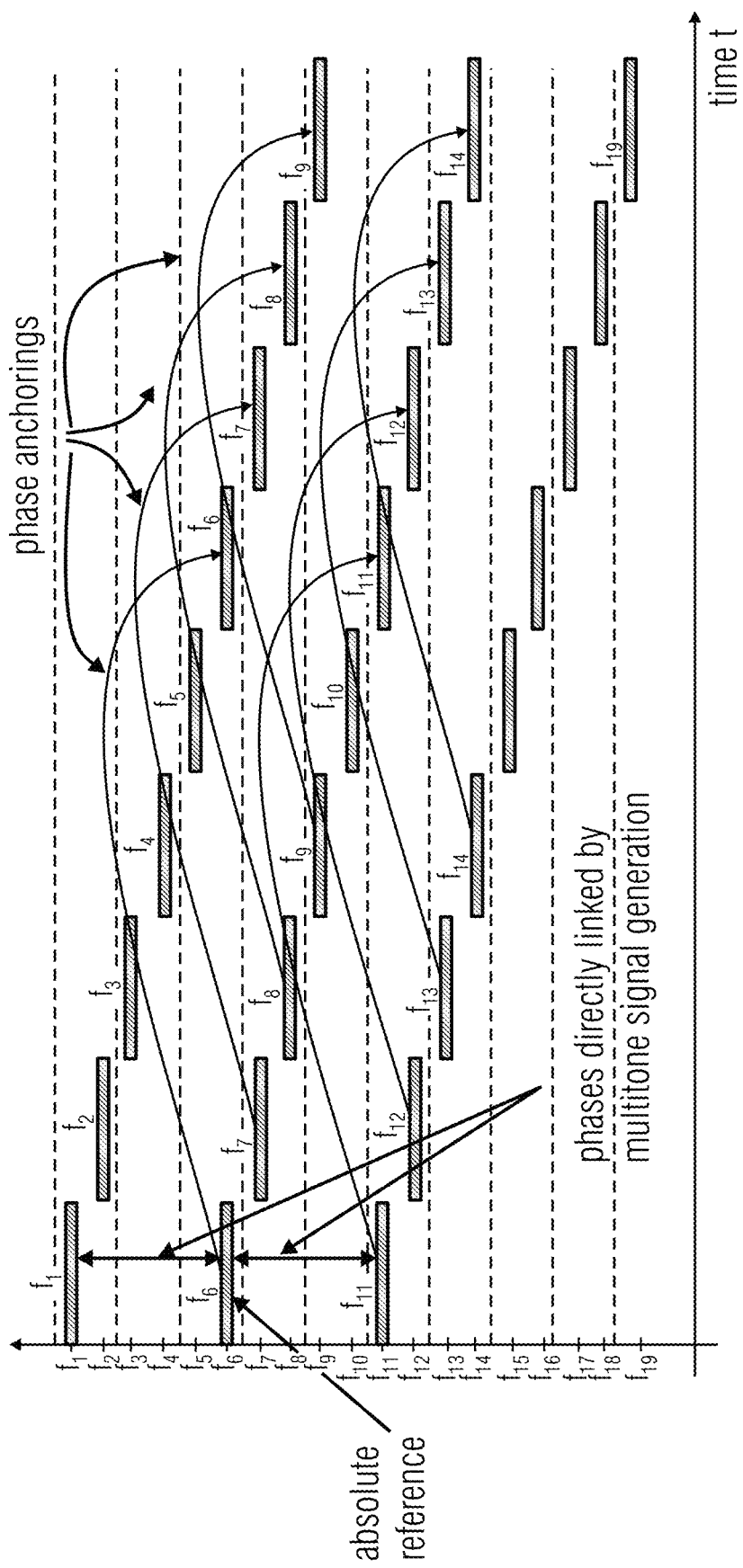
FIG. 9 shows a further frequency diagram of multitone signals that may be received with an inventive receiver according to a further example, wherein phase anchorings over the indicated frequency hops for three tones per frequency hop is exemplarily depicted.

In the above mentioned examples, a multitone signal 101 to 105 comprised two sub carriers. However, the present invention also covers multitone signals comprising three or more sub carriers. An example of multitone signals having three sub carriers is shown in FIG. 9.

Each of the multitone signals share at least one sub carrier by means of which they are linked with each other in order to determine the phase coherency in the same way as described above. The link between each of the mutually shared sub carriers is illustrated in FIG. 9 by the arrows referenced as 'phase anchorings'. As mentioned before, the inventive principle also applies for multitone signals comprising more than two single tones or sub carriers.

Localization

As mentioned above, the inventive principle allows for a reconstruction of a phase coherency of a received radio signal in a frequency hopping method using multitones 101 to 105.

The phase coherency may, for example, be further exploited for localization purposes of a receiver or a transmitter within a wireless communication network, such as shown in FIGS. 13A, 13B, 14 and 15.

Figure 13A:
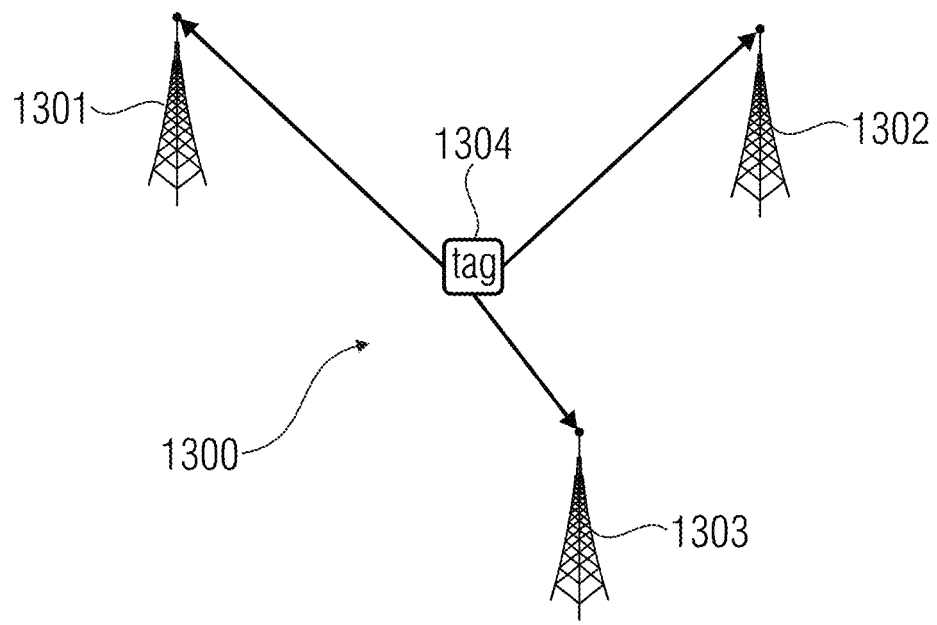
FIG. 13A shows a wireless communication network in an uplink mode according to an example.

FIG. 13A shows a wireless communication network in which the inventive receiver may be a node.

In particular, FIG. 13A shows a wireless communication network 1300 comprising three base stations, 1301, 1302, 1303, which are also referred to as eNodeB or eNB in case of LTE networks.

The wireless communication network 1300 may also comprise a user equipment 1304, abbreviated with UE, which may be a mobile device, such as a smartphone, a notebook, a tablet or the like.

Figure 13B:
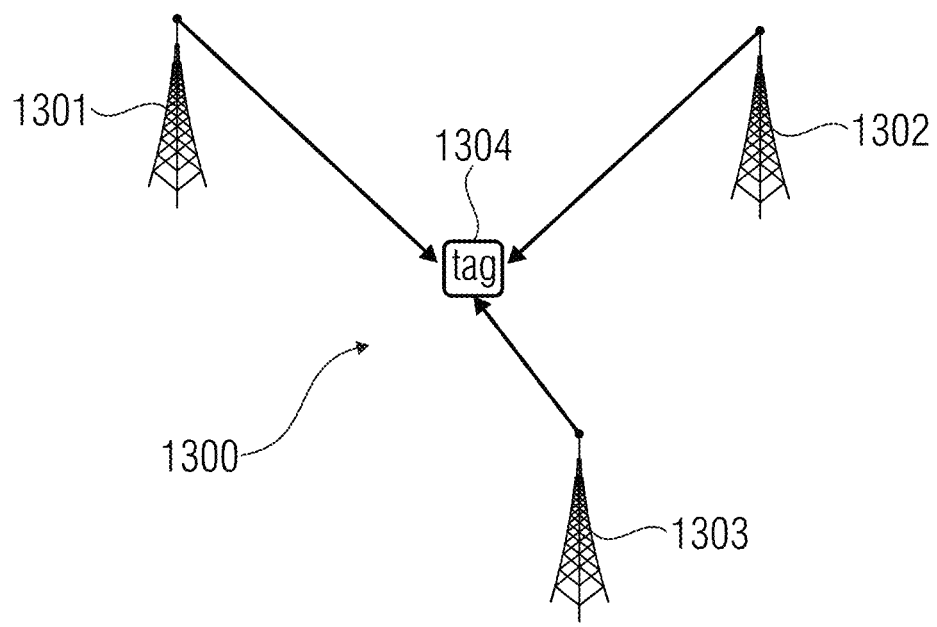
FIG. 13B shows the wireless communication network of FIG. 13A in a downlink mode according to an example.

The difference between FIGS. 13A and 13B is the way of communication. That is, in FIG. 13A the nodes 1301, 1302, 1303, 1304 communicate in the uplink, i.e. the UE 1304 is the transmitter while the base stations 1301, 1302, 1303 work as receivers.

In FIG. 13B, the nodes 1301, 1302, 1303, 1304 communicate in the downlink, i.e. the UE 1304 is the receiver while the base stations 1301, 1302, 1303 work as transmitters.

According to an example, the present invention also provides a wireless communication network 1300 comprising a receiver 1301, 1302, 1303, 1304 of one of the preceding claims and a transmitter 1301, 1302, 1303, 1304.

For the purpose of spatial position detection of the UE 1304, it may be advantageous if the UE 1304 works in the downlink as shown in FIG. 13B. That is, the UE 1304 acts as an inventive receiver while the base stations 1301, 1302, 1303 acts as transmitters. The transmitters 1301, 1302, 1303 may transmit a PRS like signal, for example.

According to an example of the invention, the wireless communication network 1300 may work in a downlink mode, wherein the receiver is a mobile terminal (UE) 1304 and the transmitter ($eNB_1$-$eNB_3$) is a base station 1301, 1302, 1303, and wherein the wireless communication network 1300 uses an IFFT (Inverse Fast Fourier Transform) based radio signal. The phase uncertainty may then only be determined by the (actively hopping) receiver.

In order to provide for a precise position detection, radio localization of frequency hopping radio transmitters shall exploit the entire bandwidth of the frequency hopping radio signal in order to achieve high accuracy and robustness. In order to achieve this goal, the radio signal has to be coherent with respect to its phase throughout each and every frequency. Otherwise, the coherency of the phase shall be at least producible or reconstructable, for example by means of a calibration as suggested by the present invention. However, a minimum effort is desired for this purpose.

Figure 14:
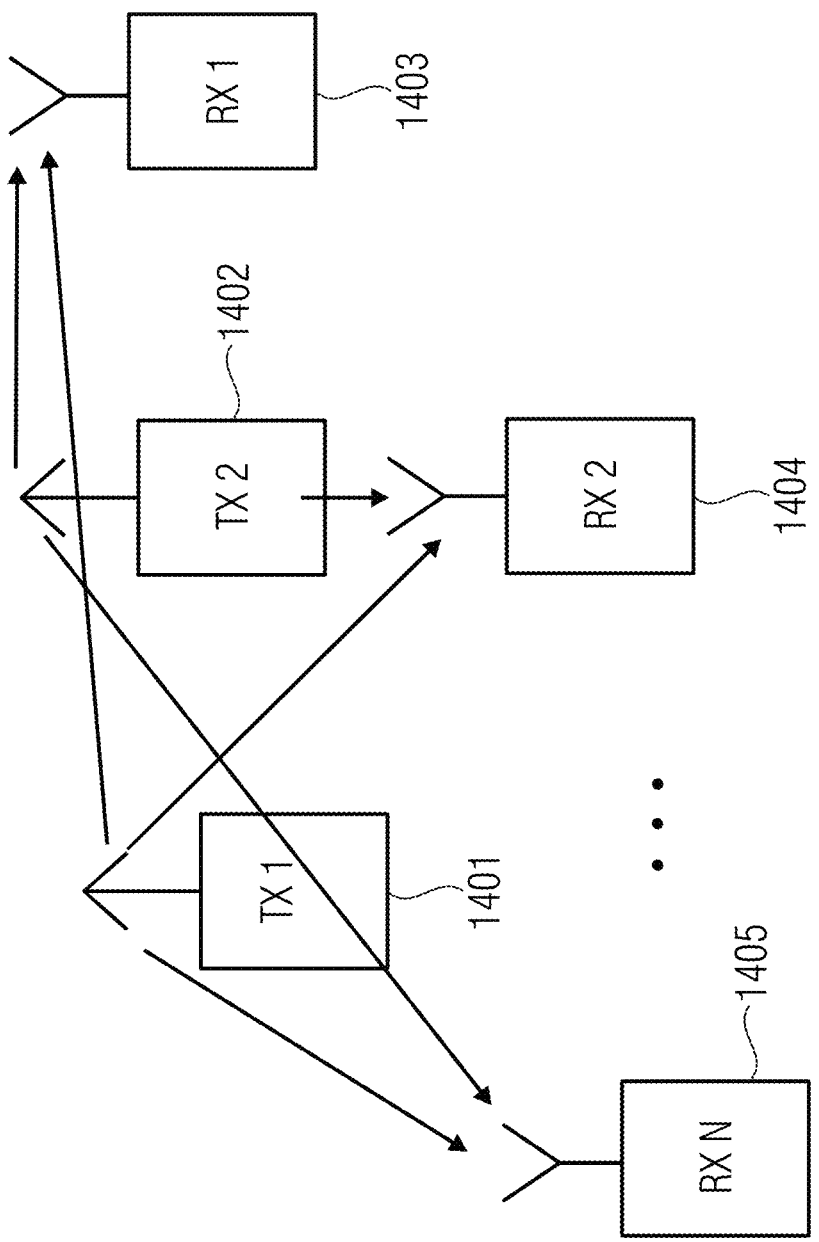
FIG. 14 shows a block chart of a wireless communication network according to an example, wherein a cell of a wireless communication network comprising two frequency hopping multitone transmitters (TX) and N distributed receivers (RX) is exemplarily depicted.
Figure 15:
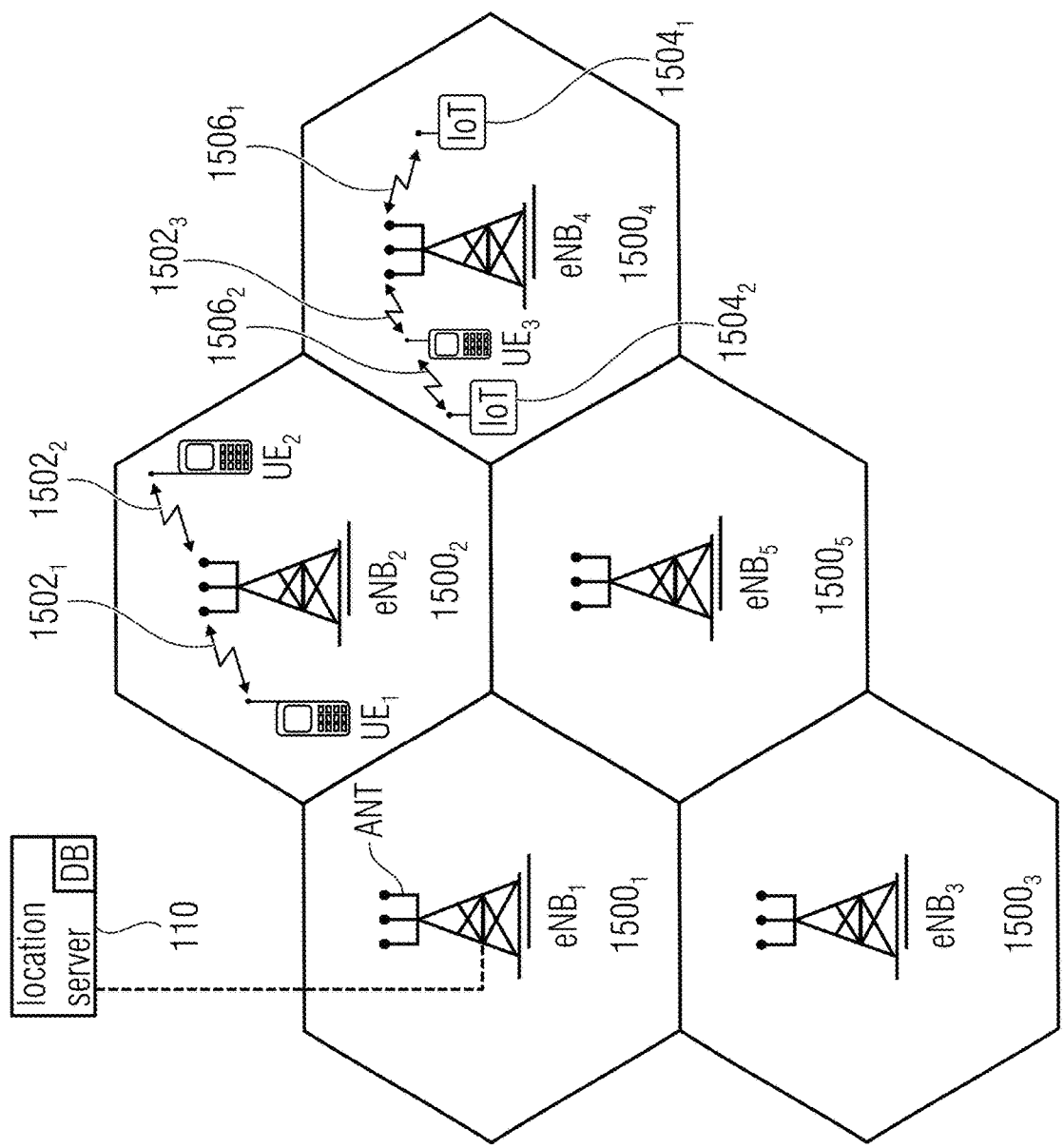
FIG. 15 shows a further wireless communication network according to an example.

FIG. 14 shows a wireless communication network 1400 similar to the one described above with reference to FIG. 13. However, in this example, a plurality of transmitters 1401, 1402 and a plurality of receivers 1403, 1404, 1405 are present in the network 1400. As mentioned before, the UEs and the base stations may either act as transmitters or as receivers, depending on the mode (downlink or uplink) of the wireless communication network 1400.

According to the invention, the following examples of transmitter variants and receiver variants may be imaginable.

Transmitter Variants 1) generation of the multi tone analogously with sine mixer
2) generation of the multi tone digitally with sine mixer 3) generation of the multi tone digitally with discrete Fourier-Transformation (DFT)
4) generation of the multi tone digitally with modulation (spectral conversion as for MBOC-signals or Hadamard-sequences)
5) generation with two transmitter chains, wherein one transmitter chain transmits while the other transmitter chain is detuned, in order to minimize the guard interval times $T_{guard}$.
6) Number of multi tone signals per frequency hop is two.
7) Number of multi tone signals per frequency hop is larger than two.
8) reduction of the multi user interference Receiver Variants 1) with one antenna
   a. with broadband receiver which covers the totality of the spectrum $B_{overall}$ (Basestation realization; phase uncertainty originated from the transmitter)
      i. Further processing with digital numerical frequency synthesis and digital mixer
      ii. Further processing with DFT
   b. with narrow band receiver which covers the maximum distance of the tones plus the band width of the signals being modulated onto the tones including a reserve (simple tag/UE realization, phase uncertainty originated from receiver and transmitter). This receiver shall be tunable onto different center frequencies.
   c. with two narrow band receiver chains, such as in b), such that one receiver chain may be detuned for the next hop while the other one receives a hop.
   d. with one narrow band receiver chain per simultaneous tone. Each of these receiver chains comprises a band width that is larger than the band width of the signal being modulated onto the tone. The receiver chains may be coherently realized (maybe by means of a calibration). Depending on the tone-constellation, the receiver chains may be tunable dependent from each other (FIGS. 1 and 3) or separately, i.e. independent from each other (all of the remaining Figures).
   e. with more narrow band receivers than simultaneous tones. A smart choice reduces the number of needed hops. If more than two times the number of receiver chains are present than simultaneous tones, then a first half of the receiver chain may be detuned for the next hop while the second half of the receiver chains receives a hop.
2) with a group antenna of M antenna elements
   a. with broadband receiver of M coherent chains covering the totality of the spectrum $B_{overall}$.
      i. Further processing with digital numerical frequency synthesis and digital mixer
      ii. Further processing with DFT
   b. with coherent narrow band receiver comprising M chains, the receiver covering the maximum distance of the tones plus the bandwidth of the signal being modulated onto the tones including a reserve. The receiver chains shall be tunable onto different center frequencies.

Just by way of non-exhausting and non-limiting examples, the following approaches may be used for a localization of an inventive receiver within a wireless communication network based on the phase coherency that has been reconstructed according to the above described inventive principle.

Position Detection Based on Time Differences

The reconstructed phase coherency may be used for a phase-based (relative) estimation of a TDoA (Time Difference of Arrival) or for synchronization purposes. This happens similar to high precise satellite navigation. According to the Real-Time-Kinetics-method (RTK) particularly the relative phases (as double differences) are considered. This may also be referred to as phase difference of arrival. For a two-dimensional position detection, at least four spatially distributed synchronized receivers are needed.

A further application for the inventive principle is the broadband estimation of the incident angle, i.e. the estimation of the DoA (Direction of Arrival), which allows for a better resolution of multipaths when compared to narrowband variants. For a DoA, a receiver with a group antenna comprising M>1 antenna elements is needed which will be mutually processed. Advantageously (but not necessarily), the receiver paths are coherent thereto. Possible methods for exploiting DoA may be, for instance, covariance-beamforming (or Bartlett-Beamforming) [krim96], Capon's method [capon83], MUSIC-algorithm [schmidt86a] or ESPRIT-algorithm [roy89].

A combination of these two methods for exploiting the achieved signal data (or phases) may be the common estimation of ToA (or TDoA) and DoA, which is also referred to as Joint Angle and Delay Estimation (JADE) [vanderveen07], as SI-JADE [vanderveen07] or as 2D-MUSIC [schmidt86].

The invention may further be used in methods for direct position detection (Direct Positioning), in which the position of a transmitter may be determined directly, similar to the above mentioned RTK-method, from the received and sampled signals. A combination of synchronized receivers with stand-alone antennas or group antennas may be used.

The base band signal $s_k(t)$ is mixed to frequency $f_k$ and transmitted as high frequency signal $$s_{HF,k}(t)=s(t)\exp(j2\pi f_k t)\exp(j\phi_{TXLO,k})$$

via the channel. The phase of the free running oscillator for the carrier synthesis $\phi_{TXLO,k}=\phi_{TXLO}+\phi_{fk}$ is therefore arbitrary. For simultaneously transmitted carrier signals, the phase is composed of a common phase term $\phi_{TXLO}$ and a defined frequency dependent portion $\phi_{fk}$. At the receiver i there will be preliminarily the following result $$r_{HF,i,k}(t)=\beta_{i,k}\cdot\exp(j(2\pi f_k(t-\tau_i)+\phi_{TXLO,k}))\cdot s(t-\tau_i)+w_{HF}(t)$$

with runtime delay $\tau_i$ and a noise term $w_{HF}(t)$. After mixing into the base band with locally generated carrier oscillation $\exp(j(\phi_{RXLO,i,k}-2\pi f_k t))$ the result is $$r_{i,k}(t)=\beta_{i,k}\cdot\exp(j(\phi_{TXLO,k}-\phi_{RXLO,i,k}-2\pi f_k \tau_i))\cdot s(t-\tau_i)+w(t),$$

wherein w(t) is the resulting white noise process. The local phase $\phi_{RXLO,i,k}$ is composed additively from a frequency-independent phase $\phi_{RXLO,i}$ and the defined portion $\phi_{fk}$.

Thus, in case of a signal processing of the multi carrier signal, which signal processing may be defined analogously to the signal generation, the common inseparable carrier phase $$\phi_{LO,k,i}=\phi_{TXLO,k}-\phi_{RXLO,k,i}=\phi_{TXLO}-\phi_{RXLO,i}=\phi_{LO,i}$$

is frequency independent. Accordingly, only the portion $-2\pi f_{i,k}\tau_i$ brings a frequency dependency of the phase into the receiving signal $$r_i(t)=\beta_{i,k}\cdot\exp(j\phi_{i,k})\cdot s(t-\tau)+w(t),$$

which can then be written as $\phi_{i,k}=\phi_i-2\pi f_k\tau$. Thus, from the phase difference of the tones $$\Delta\phi_{i,k_1k_2}=\mathrm{mod}(2\pi(f_{k_1}-f_{k_1})\tau_i,2\pi)$$

it is possible to ambiguously deduce the delay or distance $$d_i = c_0\tau_i = \frac{c_0}{(f_{k_1}-f_{k_1})}\cdot\left(\frac{\Delta\phi_{i,k_1k_2}}{2\pi}+n\right)$$

For non-synchronous transmitter and receiver, however, it is composed of two terms: besides a term for the duration of the wave propagation $\tau_{prop,i}=d_i/c_0$ there is also the difference of the local times $\Delta T_i=T_{RXi}-T_{TX}$ to be considered.

TDOA-systems exploit differences of runtime delays of synchronized receivers (i.e. $\Delta T_i=\Delta T$) in order to detect the position. For two receivers $i_1$ and $i_2$, a hyperbola results from the differences of the distances, wherein each possible point lies on said hyperbola. This may also be mapped on the phases by means of double-differences:

$$\Delta\phi_{i_1i_2k_1k_2}=\Delta\phi_{i_2k_1k_2}-\Delta\phi_{i_1k_1k_2}=\mathrm{mod}(2\pi(f_{k_1}-f_{k_1})(\tau_{prop,i_2}-\tau_{prop,i_1}),2\pi)$$

and therewith also the ambiguous relation $$d_{i_2}-d_{i_1}=\frac{c_0}{f_{k_1}-f_{k_1}}\left(\frac{\Delta\phi_{i_1i_2k_1k_2}}{2\pi}+n\right),$$

which results in a multitude of hyperbolas (around the parameter n).

The hyperbola is created by solving $$[(x-x_2)^2+(y-y_2)^2]^{1/2}-[x-x_1)^2+(y-y_1)^2]^{1/2}=\lambda(\Delta+n).$$

Since the phase measurement $\Delta\hat\phi_{k_1k_2i_1i_2}=\Delta\phi_{k_1k_2i_1i_2}+\Delta\phi_{noise}$ is very noisy, the lever $f_{k_1}-f_{k_1}$ should be as large as possible. However, the practical resolution of the ambiguity involves large beat wave lengths $$\frac{c_0}{f_{k_1}-f_{k_1}}.$$

Figure 10:
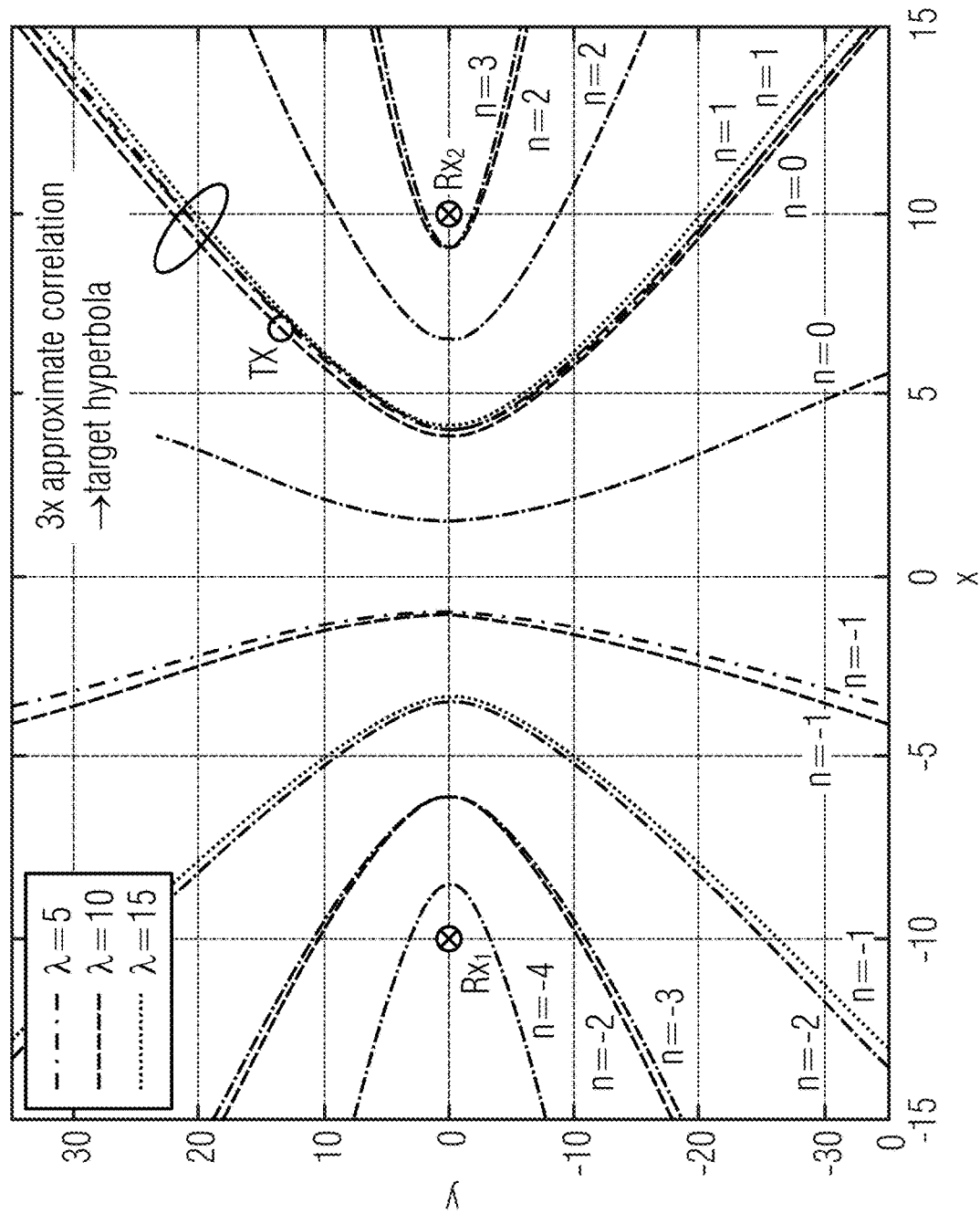
FIG. 10 shows a diagram of a TDoA measurement according to an example, wherein an ambiguity resolution of a target hyperbola by matching during a measurement at three frequencies (or at the wavelengths) is exemplarily depicted.

This may, however, be avoided by using more than two carrier frequencies having a low minimum distance for the resolution of the ambiguity and having a large maximum distance for the accuracy, such as shown in FIG. 10 for three frequencies.

Furthermore, multipath propagation interferes with the direct derivative of the phase. Flat fading causes overlaps of the propagation paths according to $$y_{i,k,n}=\sum_{l=0}^{L-1}\beta_{i,k,l}\cdot\exp(j\phi_{i,k,l})s_{k,l,n}+w_{i,k,n}$$

which therefore causes arbitrary phases at the receiver i. The single path delays $\tau_{i,l}$ cause overlapping phase ramps over the frequency $f_k$ in $\phi_{i,k,l}$. They can be separated with frequency estimators according to the above mentioned methods (covariance-beamforming, MUSIC [schmidt83], and ESPRIT [roy89]). Where appropriate, a spectral smoothing and/or a forward-backward-averaging may be useful or even needed. Also in this case it might be helpful to use multiple carrier phase differences for estimating the AoA. It is generally valid for each receiver path that the number of the available carrier phases K or differences determines the number of solvable multipaths L (number of parameters K>L, i.e. the number of observations). Furthermore, the overall bandwidth determines the accuracy of the separation and estimation.

However, a plurality of simultaneous measurements are needed. Broadband signals, however, may only be generated with quite high expenditure and electrical current consumption. Therefore, a sequential measurement with narrow band signals is desired.

A mere frequency hopping method may have the disadvantage that in most of the transceivers new phases $\phi_{TXLO,k}$ and $\phi_{RXLO,ki}$ occur randomly during retuning to the new frequency $f_k$, such that the phase relations may not be correctly analyzed anymore.

The present invention addresses this aspect in that the frequency hopping transmitter transmits two signals simultaneously at several sub carriers. Now, the phase differences from two subsequent frequency hops may be mutually analyzed in a quasi-coherent manner, when at least one of the sub carriers is transmitted in both frequency hop intervals. The mutual sub carrier therefore serves the purpose of anchoring or linking the phase relations. For more than two frequency hop intervals, a plurality of virtually chained measurements may be generated $$\exp(j\Delta\phi_{i,11})=1$$

$$\exp(j\Delta\phi_{i,12})=\exp(j(\phi_{i,2}-\phi_{i,1}))$$

$$\exp(j\Delta\phi_{i,13})=\exp(j\Delta\phi_{i,23})\exp(j\Delta\phi_{i,12})=\exp(j(\phi_{i,3}-\phi_{i,2}))\exp(j(\phi_{i,2}-\phi_{i,1}))$$

$$\exp(j\Delta\phi_{i,14})=\exp(j\Delta\phi_{i,34})\exp(j\Delta\phi_{i,23})\exp(j\Delta\phi_{i,12})=\exp(j\Delta\phi_{i,24})\exp(j\Delta\phi_{i,12})$$

The result is a desired discrete sampling of the channel phase in the frequency domain. If needed, the channel amplitude $\beta_{i,k}$ to be measured may be included. It is an advantage of this chained method that the local phase change resulting from the frequency hop is not measured here.

When double-differences of the phases $\Delta\phi_{i_1i_2k_1k_2}=\Delta\phi_{i_2k_1k_2}-\Delta\phi_{i_1k_1k_2}$ may be used at the receivers $i_1$ and $i_2$, anchoring to one single tone may also be omitted, such that the phase differences are exploited over the bandwidth. Similar to widelaning [blewitt89], the $$\frac{c_0}{f_{k_2}-f_{k_1}}$$

wavelength determines the solvable ambiguity, which may then be analyzed with the Lambda-method [teunissen97]. A calibration by means of a reference transmitter would then be based on triple-differences.

It may be a disadvantage that the errors may sum up in case of a plurality of tones. Furthermore, possibly available magnitude information may get lost. However, the magnitude contains a significant portion of information, particularly in multipath-scenarios. It may be recorded relatively, just like the phase, according to:

$$\bar\beta_{i,1}=1$$

$$\bar\beta_{i,2}=\frac{\beta_{i,2}}{\beta_{i,1}}$$

$$\bar\beta_{i,3}=\frac{\beta_{i,3}}{\beta_{i,2}}\cdot\bar\beta_{i,2}=\frac{\beta_{i,3}}{\beta_{i,1}}$$

$$\bar\beta_{i,4}=\frac{\beta_{i,4}}{\beta_{i,3}}\cdot\bar\beta_{i,3}=\frac{\beta_{i,4}}{\beta_{i,1}}$$

...

It may subsequently be used for an angle estimation together with the relative phase which has been determined as mentioned above. However, the same disadvantage of the increase in mean error square shows up in this case as well (here in the product).

In order to reduce the number of overlaps, and therefore the increase of errors, when calculating the relative phase and relative magnitude, a tone in the mid-range of the spectrum should be used as a reference.

When some of the receivers, or their antennas respectively, are closely tied together in one line, an angle estimator results therefrom. For these, multicarrier methods help resolving multipaths.

The overall receiving signal for a two-carrier signal results from L received single signals. They may also be portions of a multipath of a transmit signal. The vector of the receiving signal of the $i^{th}$ receiver at time n is given for two tones as $$y_{i,n} = \begin{pmatrix} y_{i,0,n} \\ y_{i,1,n} \end{pmatrix} = \begin{pmatrix} A(\theta_i, f_{k_0})B_{i,k_0}\Phi_{i,k_0} & 0 \\ 0 & A(\theta_i, f_{k_1})B_{i,k_1}\Phi_{i,k_1} \end{pmatrix} \begin{pmatrix} s_{0,n} \\ s_{1,n} \end{pmatrix} + \begin{pmatrix} w_{0,n} \\ w_{1,n} \end{pmatrix}.$$

Therein, A ($\theta$, $f_{k_p}$) is the steering matrix with dimension (M×L) (M antennas, L paths). $B_{i,k}$ is a (L×L) diagonal matrix with a channel gain of the $k^{th}$ sub carriers of the single propagation paths on their diagonal like the receiving phase matrix $\Phi_{i,k}$=diag($\phi_{i,k,0}$, ... $\phi_{i,k,L-1}$). These carrier phases result, like in the case of a receiving antenna, in $\phi_{i,k,l}$=2π $f_k \tau_{i,l} + \phi_{i,l}$. The angles of arrival of the channel paths are contained in $\theta_i = (0\theta_0, \ldots \theta_{L-1})^T$.

In common bandwidths $B_{i,k_1} \approx B_{i,k_2} = B_i$ may be approximated. The dependency of the steering matrix A($\theta$, $f_{k_0}$) is larger for high bandwidths such that they should not be assumed as equal.

As described above, the bandwidth may be extended over incoherent frequency hops based on a linkage of multitone signals. The angle of arrival may then be estimated in a quasi-coherent manner over all frequency tones, for example by means of MUSIC [schmidt83], ESPRIT [roy89], Matrix Pencil [Yilmazer10] or other methods. After elimination of the modulation in $s_{1,n}$ and $s_{2,n}$ (unmodulated $s_{0,n}$) and after elimination of the relative phase, the above mentioned block-diagonal extended steering matrix (solely for the direct path) can be combined into a staple of sub-matrices (which are located above on the diagonal)

$$y_{i,n} = \sum_{l=1}^{L} \beta_{i,l} \begin{pmatrix} \exp(j\phi_{i,k_1,l})a(\theta_l, f_{k_1}) \\ \exp(j(\phi_{i,k_2,l} - \Delta\phi_{i,k_1 k_2,0}))a(\theta_l, f_{k_2}) \end{pmatrix} s_{0,n} +$$

$$\beta_{i,0} \cdot \exp(j\phi_{i,l}) \begin{pmatrix} a(\theta_0, f_{k_1}) \\ a(\theta_0, f_{k_2}) \end{pmatrix} s_{0,n} + \begin{pmatrix} w_{1,n} \\ w_{2,n} \end{pmatrix}.$$

The phase difference of both frequency proportions $$\phi_{i,k_2,l} - \Delta\phi_{i,k_1 k_2,0} - \phi_{i,k_1,l} =$$
$$2\pi[f_{k_2}\tau_{i,l} - 2(f_{k_2} - f_{k_1})\tau_{i,0} - f_{k_1}\tau_{i,l}] = 2\pi(f_{k_2} - f_{k_1})(\tau_{i,l} - \tau_{i,0})$$

is then, for each multipath with l>0, more randomly distributed in [0,2π], the more $\tau_{i,0}$ differs from $\tau_{i,l}$ or the more $f_{k_1}$ differs from $f_{k_2}$.

This may be extended to more than two tones with the help of the herein suggested inventive method for linking frequency hopping signals, such that the influence of each of the indirect receiving paths $\tau_{i,l} > \tau_{i,0}$ will (statistically) decrease for a direction estimation, i.e. they will be lower weighted on average.

Accordingly, the starting equation for P tones will be:

$$y_{i,n} = \begin{pmatrix} A(\theta, f_{k_0})B_{k_0}\Phi_{k_0} & 0 & \cdots & 0 \\ 0 & A(\theta, f_{k_1})B_{k_1}\Phi_{k_1} & & 0 \\ \vdots & & \ddots & \vdots \\ 0 & 0 & \cdots & A(\theta, f_{k_{P-1}})B_{k_{P-1}}\Phi_{k_{P-1}} \end{pmatrix}$$

$$\begin{pmatrix} s_{0,n} \\ s_{1,n} \\ \vdots \\ s_{P-1,n} \end{pmatrix} + \begin{pmatrix} w_{0,n} \\ w_{1,n} \\ \vdots \\ w_{P-1,n} \end{pmatrix}$$

such that it results in $$y_{i,n} = \sum_{l=1}^{L} \beta_{i,l} \begin{pmatrix} \exp(j\phi_{i,k_1,l})a(\theta_l, f_{k_1}) \\ \exp(j(\phi_{i,k_2,l} - \Delta\phi_{i,k_1 k_2,0}))a(\theta_l, f_{k_2}) \\ \vdots \\ \exp(j(\phi_{i,k_P,l} - \Delta\phi_{i,k_1 k_P,0}))a(\theta_l, f_{k_P}) \end{pmatrix} s_{0,n} +$$

$$\beta_{i,0} \cdot \exp(j\phi_{i,l}) \begin{pmatrix} a(\theta_0, f_{k_1}) \\ a(\theta_0, f_{k_2}) \\ \vdots \\ a(\theta_0, f_{k_P}) \end{pmatrix} s_{0,n} + \begin{pmatrix} w_{k_1,n} \\ w_{k_2,n} \\ \vdots \\ w_{k_P,n} \end{pmatrix}$$

The other phase portions can be assumed as known, i.e. they are canceled in an estimation of the angle of arrival.

Figure 11:
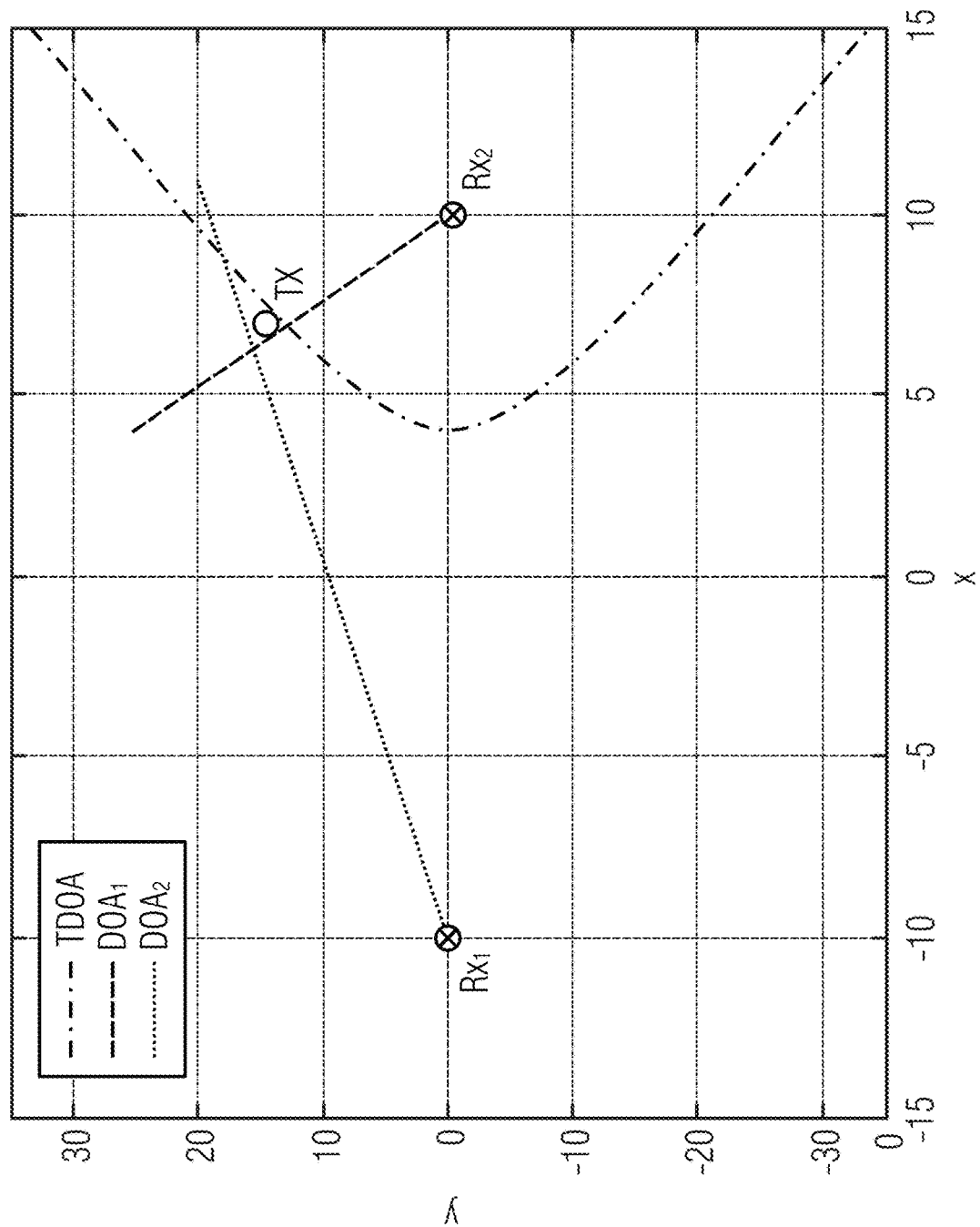
FIG. 11 shows a further diagram of a combined DoA-TDoA measurement according to an example, wherein a position detection by means of a combined estimation of the direction/angle (Direction of Arrival) and time difference (ToA/TDoA) is exemplarily depicted, wherein $DoA_2$ is not necessary.

A further (but according to the above considerations, a direct) extension may be the combined estimation of angles and delays. With the achieved delays, a TDoA-method may be executed at several measurement-nodes such that a position may be estimated from a combination of differences of the times of arrival (hyperbolas) and angles of arrival (beams), as shown in FIG. 11. To do so, at least one further synchronized receiver with at least one antenna element is needed.

Direct Position Calculation

Figure 12:
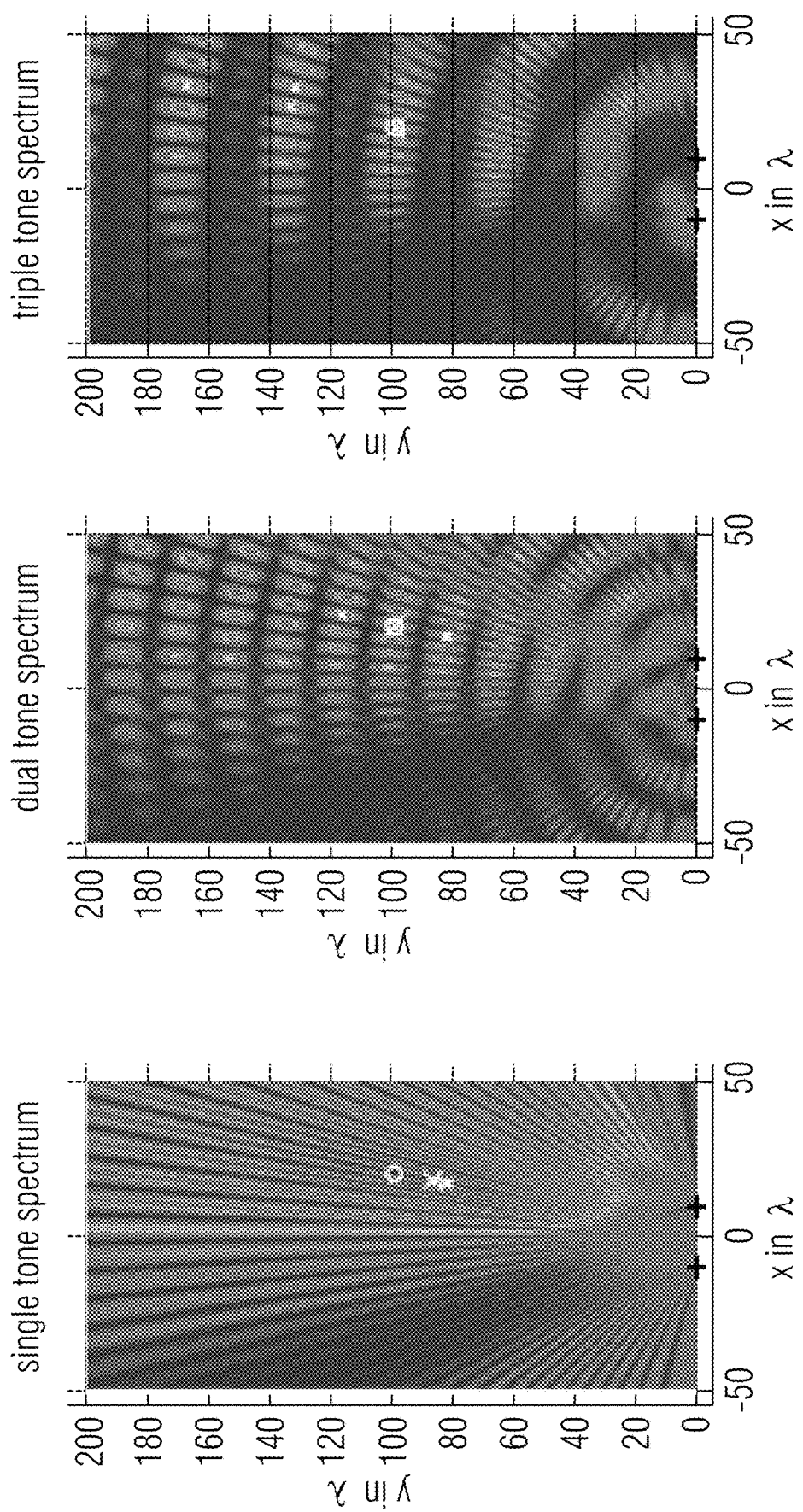
FIG. 12 shows three exemplary diagrams of a MUSIC-spectrum according to an example, wherein a direct positioning by means of multitone signals is exemplarily depicted (left—one tone; middle—two tones; right—three tones)

A further application in which the invention may be used are direct position estimation methods, as they are described in [weiss05] or [hadaschik15]. The possibility of using a plurality of coherent tones allows for a substantially higher accuracy. The mathematical model does not differ from a multi tone estimation. FIG. 12 shows the gain that may be achievable by adding coherent frequency tones for a direct position estimation based on a spatial MUSIC-spectrum [hadaschik15]. Two angle estimation receivers with six antenna elements each are positioned at (0,−10) and (0,10). By adding one coherent tone, an (ambiguous) distance is extractable. One further frequency tone in between already eliminates a lot of the ambiguities and sharpens the angle spectrum.

Synchronization of Nodes within a Wireless Communication Network

The above described inventive principle may also be used for synchronizing nodes within a wireless communication network or a wireless communication sub network. These nodes to be synchronized may be a receiver or a transmitter according to the invention.

Summarizing, the present invention may be used for, e.g. localization of (relatively) narrow band transmitters, which may also be used for telemetry-transmitters. Some key words are:
Smart metering
Internet-Of-Things
LTE/5G
  NB-IOT (LTE—Narrowband IOT)
  MTC (LTE—Machine Type Communication)
  mMTC (5G—massive Machine Type Communication)

These systems usually have a high range and a massive signal spreading in common.

Telemetry-signals which are designed as mentioned above may be received from several base stations. If they are synchronized accordingly, or if their time-offset may be determined and compensated, a two-dimensional position (i.e. position in a plane) may be calculated with at least three base stations with one antenna per served sector. For base stations with more than one antenna per sector, also a direction estimation (Direction of Arrival; DoA) may be regarded for position detection.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A receiver configured to receive, by means of a frequency hopping method, a multitone radio signal carrying information, the multitone radio signal comprising an overall frequency band $f_1$ to $f_6$ comprising at least three different sub carriers $f_1$, $f_2$, $f_3$, wherein the receiver is further configured to receive, in a first frequency hopping channel and during a first frequency hop interval $T_{hop1}$, a first multitone signal portion carrying a first portion of the multitone radio signal, said first multitone signal portion comprising a first and a second sub carrier which are received simultaneously, determine a first phase difference $\Phi_{21}=\Phi_2-\Phi_1$ between the first and the second sub carrier of the first multitone signal portion, receive, in a second frequency hopping channel and during a second frequency hop interval $T_{hop2}$, a second multitone signal portion carrying a second portion of the multitone radio signal, said second multitone signal portion comprising one of the first and the second sub carriers and a third sub carrier which are received simultaneously, determine a second phase difference $\Phi_{32}=\Phi_3-\Phi_2$ between the one of the first and the second sub carriers and the third sub carrier of the second multitone signal portion, and reconstruct a phase coherency of the multitone radio signal by means of linking the phase differences $\Phi_{21}$ and $\Phi_{32}$ of the first and the second multitone signal portions in order to phase-coherently reconstruct the multitone radio signal from the received multitone signal portions.

2. The receiver of claim 1, wherein the multitone radio signal comprises a plurality of multitone signal portions, wherein each multitone signal portion is linked with at least one further multitone signal portion by at least one mutual sub carrier $f_1$ to $f_6$.

3. The receiver of claim 1, wherein at least the first and the second sub carriers of the first multitone signal portion comprise a known phase relation at point and time of transmission.

4. The receiver of claim 1, wherein a relative spectral distance between the first and the second sub carrier of the first multitone signal portion is equal to a relative spectral distance between the second and the third sub carrier of the second multitone signal portion.

5. The receiver of claim 1, wherein the receiver is configured to receive the second multitone signal portion, in the time domain, directly subsequent to the first multitone signal portion.

6. The receiver of claim 1, wherein the receiver is configured to receive, during a third frequency hop interval $T_{hop3}$, a third multitone signal portion carrying a third portion of the multitone radio signal, said third multitone signal portion comprising the third and a fourth sub carrier which are received simultaneously, wherein the receiver is further configured to determine a third phase difference $\Phi_{43}=\Phi_4-\Phi_3$ between the third and the fourth sub carrier, and to determine a phase difference between the first and the fourth sub carrier using the first, the second and the third phase differences $\Phi_{21}$, $\Phi_{32}$, $\Phi_{43}$.

7. The receiver of claim 6, wherein a relative spectral distance between the first and the second sub carrier of the first multitone signal portion is equal to a relative spectral distance between the second and the third sub carrier of the second multitone signal portion and equal to a relative spectral difference between the third and the fourth sub carrier of the third multitone signal portion.

8. The receiver of claim 6, wherein the receiver is configured to receive, in the time domain, the first, the second and the third multitone signal portions consecutively such that the second multitone signal portion is received directly subsequent to the first multitone signal portion, and the third multitone signal portion is received directly subsequent to the second multitone signal portion.

9. The receiver of claim 6, wherein the receiver is configured to receive, in the time domain, the first, the second and the third multitone signal portions non-consecutively such that the multitone signal portions are received in a randomized sequence, and wherein the receiver is configured to determine the phase difference between the first and the fourth sub carrier after receipt of the first, the second and the third multitone signal portions.

10. The receiver of claim 1, wherein spectral frequency distances between the at least three different sub carriers $f_1$, $f_2$, $f_3$ in the overall frequency band $f_1$ to $f_6$ are equal, and wherein a relative spectral distance between the sub carriers comprised by one multitone signal portion is an integer multiple of the spectral frequency distances of the overall frequency band $f_1$ to $f_6$.

11. The receiver of claim 1, wherein the frequency $f_1$ of the first sub carrier is higher than the frequency $f_2$ of the second sub carrier, and wherein the frequency $f_2$ of the second sub carrier is higher than the frequency $f_3$ of the third sub carrier.

12. The receiver of claim 1, wherein the receiver is configured to select at least one sub carrier $f_3$, $f_4$ within the overall frequency band $f_1$ to $f_6$ as a signal-free sub carrier on which the receiver does not receive any multitone signal portions.

13. The receiver of claim 12, wherein the receiver is configured to select the signal-free sub carrier $f_3$, $f_4$ prior to receiving the multitone radio signal, or to select the signal-free sub carrier $f_3$, $f_4$ adaptively during the receipt of the multitone radio signal.

14. The receiver of claim 1, wherein spectral frequency distances between the at least three different sub carriers $f_1$, $f_2$, $f_3$ in the overall frequency band $f_1$ to $f_6$ are equal, and wherein the relative spectral distance between the first and the second sub carrier comprised by the first multitone signal portion differs from the relative spectral distance between the first and the third sub carrier comprised by the second multitone portion signal by exactly one spectral sub carrier distance.

15. The receiver of claim 14, wherein the receiver is configured to receive, during a third frequency hop interval $T_{hop3}$, a third multitone signal portion carrying a third portion of the multitone radio signal, said third multitone signal portion comprising the first and a fourth sub carrier which are received simultaneously, and wherein the receiver is further configured to determine a third phase difference $\Phi_{41}=\Phi_4-\Phi_1$ between the first and the fourth sub carrier.

16. The receiver of claim 15, wherein the receiver is configured to receive the first, the second and the third multitone signal portions sequentially in time one after the other, wherein the third sub carrier is located between the second and the fourth sub carrier in the frequency domain such that the receiver receives the multitone signal portions in an ascending or a descending frequency staircase pattern.

17. The receiver of claim 15, wherein the receiver is configured to receive the first, the second and the third multitone signal portions, in the time domain, sequentially in time one after the other, wherein, in the frequency domain, the fourth sub carrier of the third multitone signal portion is located between the second sub carrier of the first multitone signal portion and the third sub carrier of the second multitone signal portion, or wherein the second sub carrier of the first multitone signal portion is located between the third sub carrier of the second multitone signal portion and the fourth sub carrier of the third multitone signal portion.

18. The receiver of claim 1, wherein spectral sub carrier distances between the at least three different sub carriers $f_1$, $f_2$, $f_3$ in the overall frequency band $f_1$ to $f_6$ are equal, and wherein the relative spectral distance between the first and the second sub carrier comprised by the first multitone signal portion differs from the relative spectral distance between the first and the third sub carrier comprised by the second multitone signal portion by more than one spectral sub carrier distance.

19. The receiver of claim 1, wherein the multitone signal portions are separated in the time domain by a guard time period $T_{guard}$.

20. A wireless communication network comprising a receiver of claim 1 and a transmitter.

21. The wireless communication network of claim 20, wherein the receiver is a mobile terminal UE and the transmitter is a base station $eNB_1$-$eNB_3$, and wherein the wireless communication network uses a multitone radio signal.

22. The wireless communication network of claim 20, wherein the transmitter is a mobile terminal UE and the receiver is a base station $eNB_1$-$eNB_3$, and wherein the wireless communication network uses a multitone radio signal.

23. The wireless communication network of claim 20, wherein the wireless communication network is configured to detect the spatial position of a receiver or a transmitter located within the wireless communication network based on the phase differences determined by the receiver.

24. The wireless communication network of claim 23, wherein the wireless communication network is configured to detect the spatial position of a receiver or a transmitter located within the wireless communication network by exploiting the phase differences for a phase-based estimation of a Time of Arrival, a Time Difference of Arrival, a Phase Difference of Arrival or for synchronization.

25. The wireless communication network of claim 23, wherein the wireless communication network is configured to detect the spatial position of a receiver or a transmitter located within the wireless communication network by exploiting the phase differences for an estimation of a Direction of Arrival.

26. The wireless communication network of claim 23, wherein the wireless communication network is configured to detect the spatial position of a receiver or a transmitter located within the wireless communication network by exploiting the phase differences for a combined estimation of Direction of Arrival with one of Time of Arrival or Time Difference of Arrival.

27. The wireless communication network of claim 20, wherein the wireless communication network is configured to detect the spatial position of a transmitter located within the wireless communication network, based on the multitone signal portions being received and sampled by the receiver, by exploiting the multitone signal portions in methods for direct position estimation.

28. A method for receiving, by means of a frequency hopping method, a multitone radio signal carrying information, the multitone radio signal comprising an overall frequency band $f_1$ to $f_6$ comprising at least three different sub carriers $f_1$, $f_2$, $f_3$, the method comprising receiving, in a first frequency hopping channel and during a first frequency hop interval $T_{hop1}$, a first multitone signal portion carrying a first portion of the multitone radio signal, said first multitone signal portion comprising a first and a second sub carrier which are received simultaneously, determining a first phase difference $\Phi_{21}=\Phi_2-\Phi_1$ between the first and the second sub carrier of the first multitone signal portion, receiving, in a second frequency hopping channel and during a second frequency hop interval $T_{hop2}$, a second multitone signal portion carrying a second portion of the multitone radio signal, said second multitone signal portion comprising one of the first and the second sub carriers and a third sub carrier which are received simultaneously, determining a second phase difference $\Phi_{32}=\Phi_3-\Phi_2$ between the one of the first and the second sub carriers and the third sub carrier of the second multitone signal portion, and reconstructing a phase coherency of the multitone radio signal by means of linking the phase differences $\Phi_{21}$ and $\Phi_{32}$ of the first and the second multitone signal portions in order to phase-coherently reconstruct the multitone radio signal from the received multitone signal portions.

29. The method of claim 28, wherein the multitone radio signal comprises a plurality of multitone signal portions, wherein each multitone signal portion is linked with at least one further multitone signal portion by at least one mutual sub carrier $f_1$ to $f_6$.

30. The method of claim 28, wherein at least the first and the second sub carriers of the first multitone signal portion comprise a known phase relation at point and time of transmission.

31. A non-transitory digital storage medium having a computer program stored thereon to perform a method for receiving, by means of a frequency hopping method, a multitone radio signal carrying information, the multitone radio signal comprising an overall frequency band $f_1$ to $f_6$ comprising at least three different sub carriers $f_1$, $f_2$, $f_3$, the method comprising receiving, in a first frequency hopping channel and during a first frequency hop interval $T_{hop1}$, a first multitone signal portion carrying a first portion of the multitone radio signal, said first multitone signal portion comprising a first and a second sub carrier which are received simultaneously, determining a first phase difference $\Phi_{21}=\Phi_2-\Phi_1$ between the first and the second sub carrier of the first multitone signal portion, receiving, in a second frequency hopping channel and during a second frequency hop interval $T_{hop2}$, a second multitone signal portion carrying a second portion of the multitone radio signal, said second multitone signal portion comprising one of the first and the second sub carriers and a third sub carrier which are received simultaneously, determining a second phase difference $\Phi_{32}=\Phi_3-\Phi_2$ between the one of the first and the second sub carriers and the third sub carrier of the second multitone signal portion, and reconstructing a phase coherency of the multitone radio signal by means of linking the phase differences $\Phi_{21}$ and $\Phi_{32}$ of the first and the second multitone signal portions in order to phase-coherently reconstruct the multitone radio signal from the received multitone signal portions, when said computer program is run by a computer.

* * * * *